INVENTORS
HERBERT N. SHOHET
ARMAND F. AMELIO
RICHARD L. HOUSE
JOHN M. KOWALONEK
BY Vernon D. Hauschild
ATTORNEY

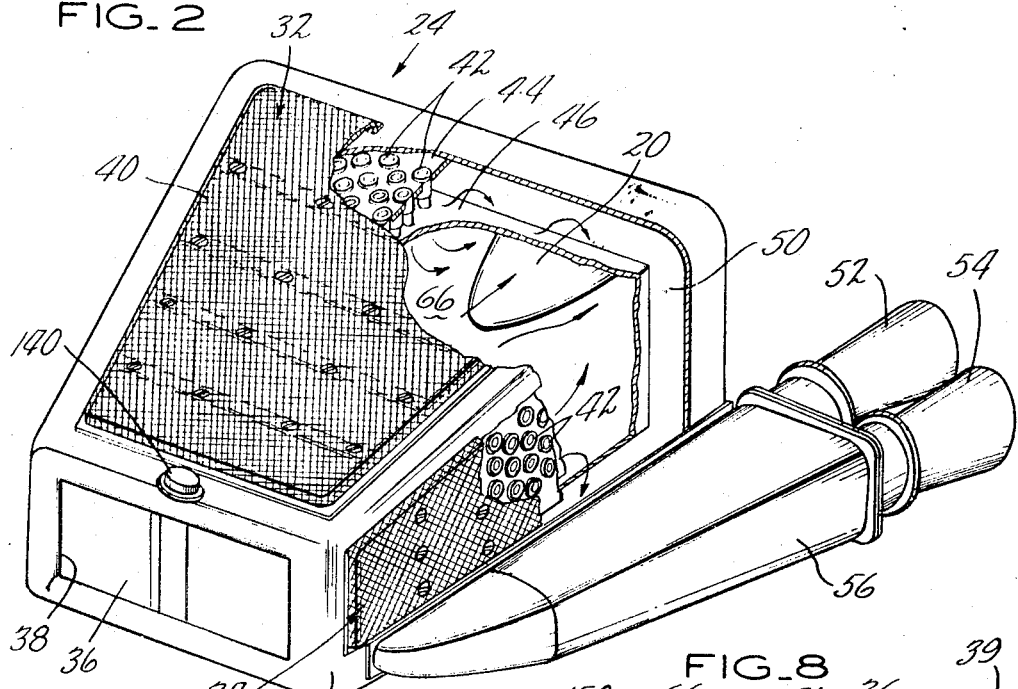
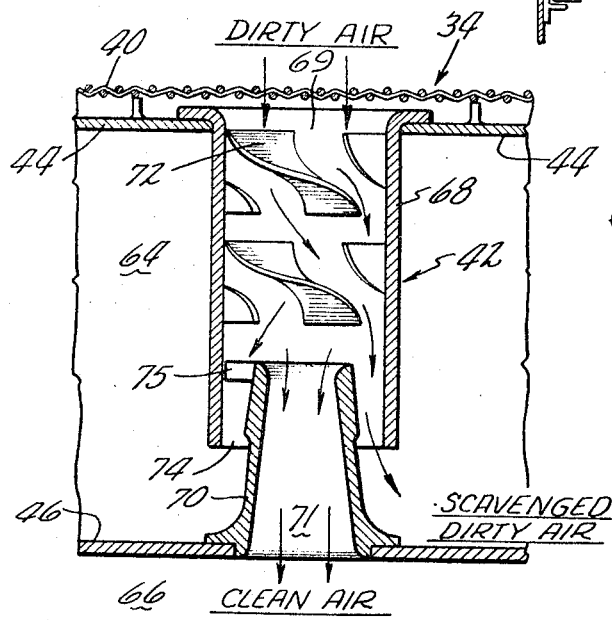
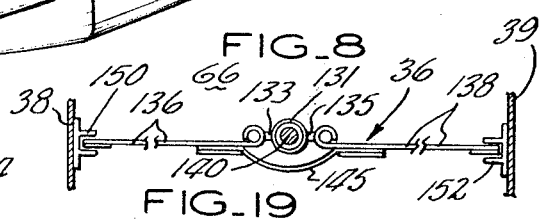
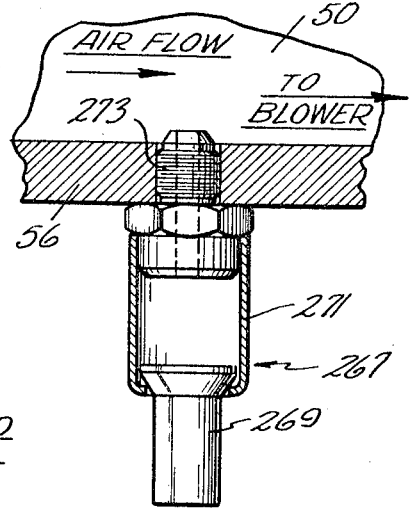

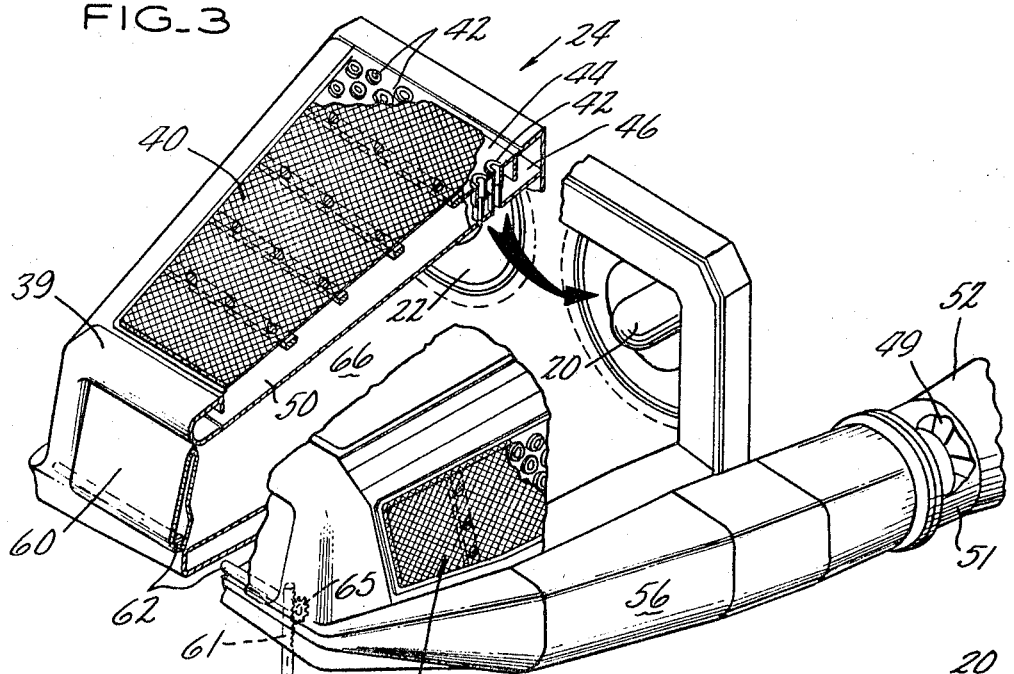
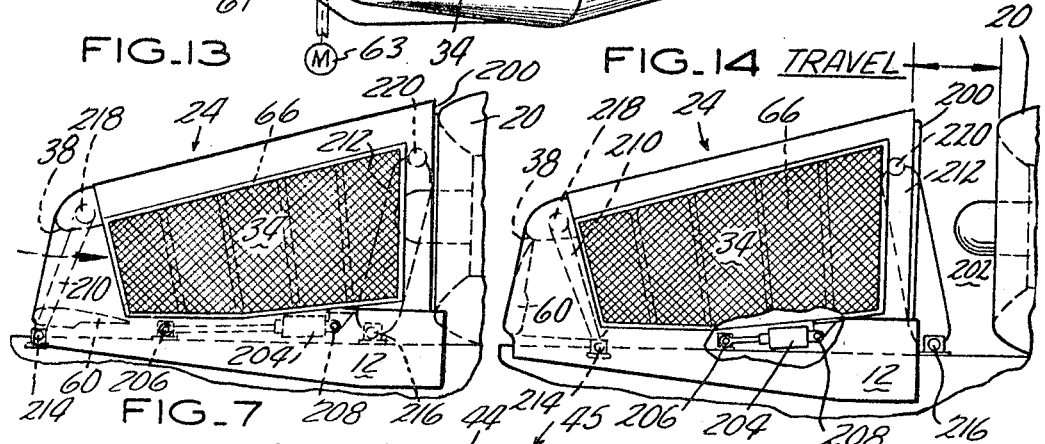
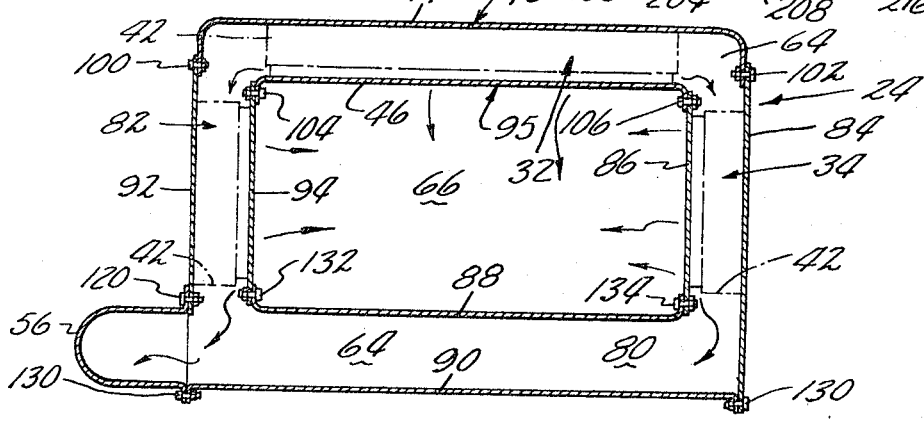

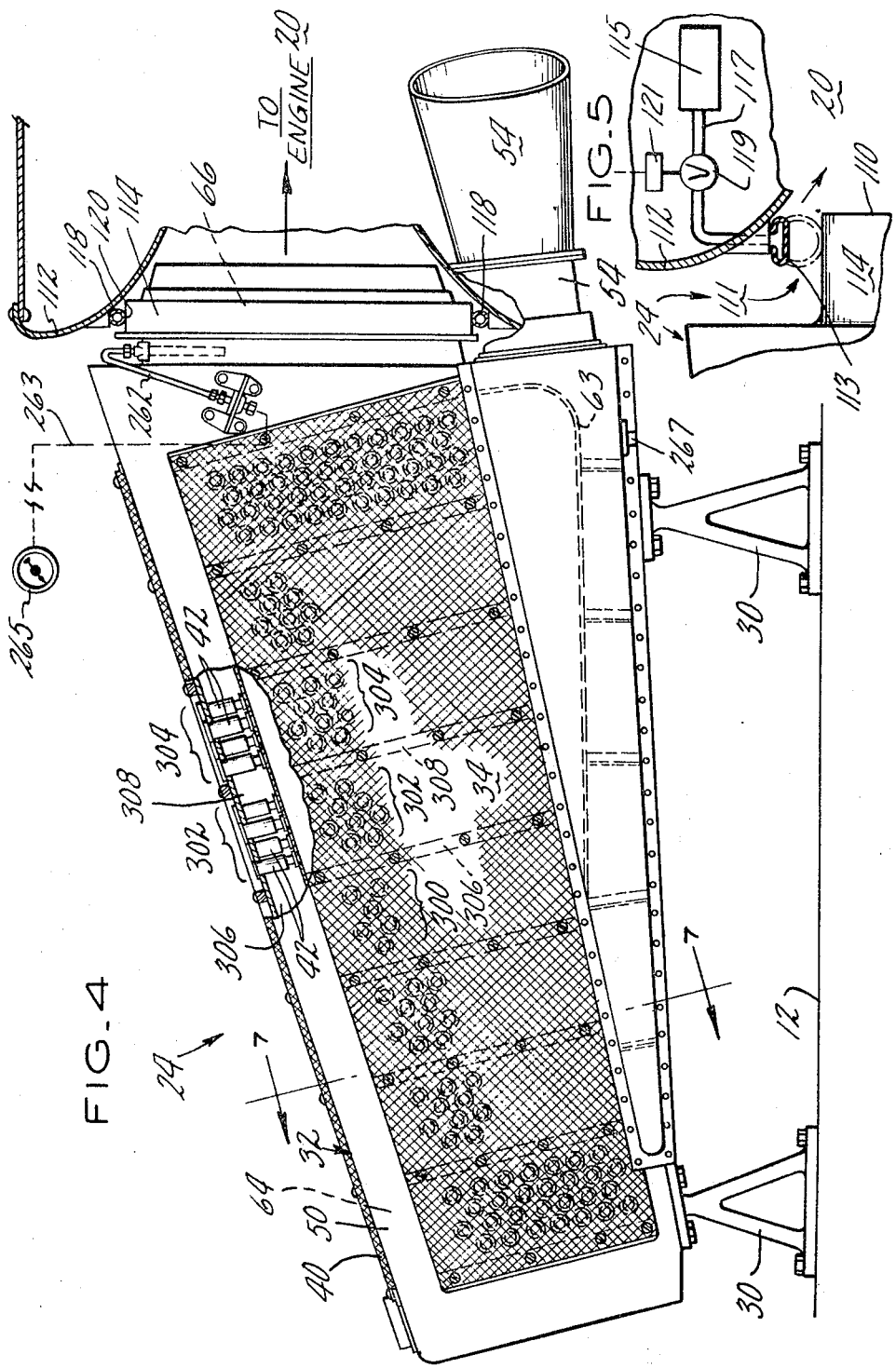

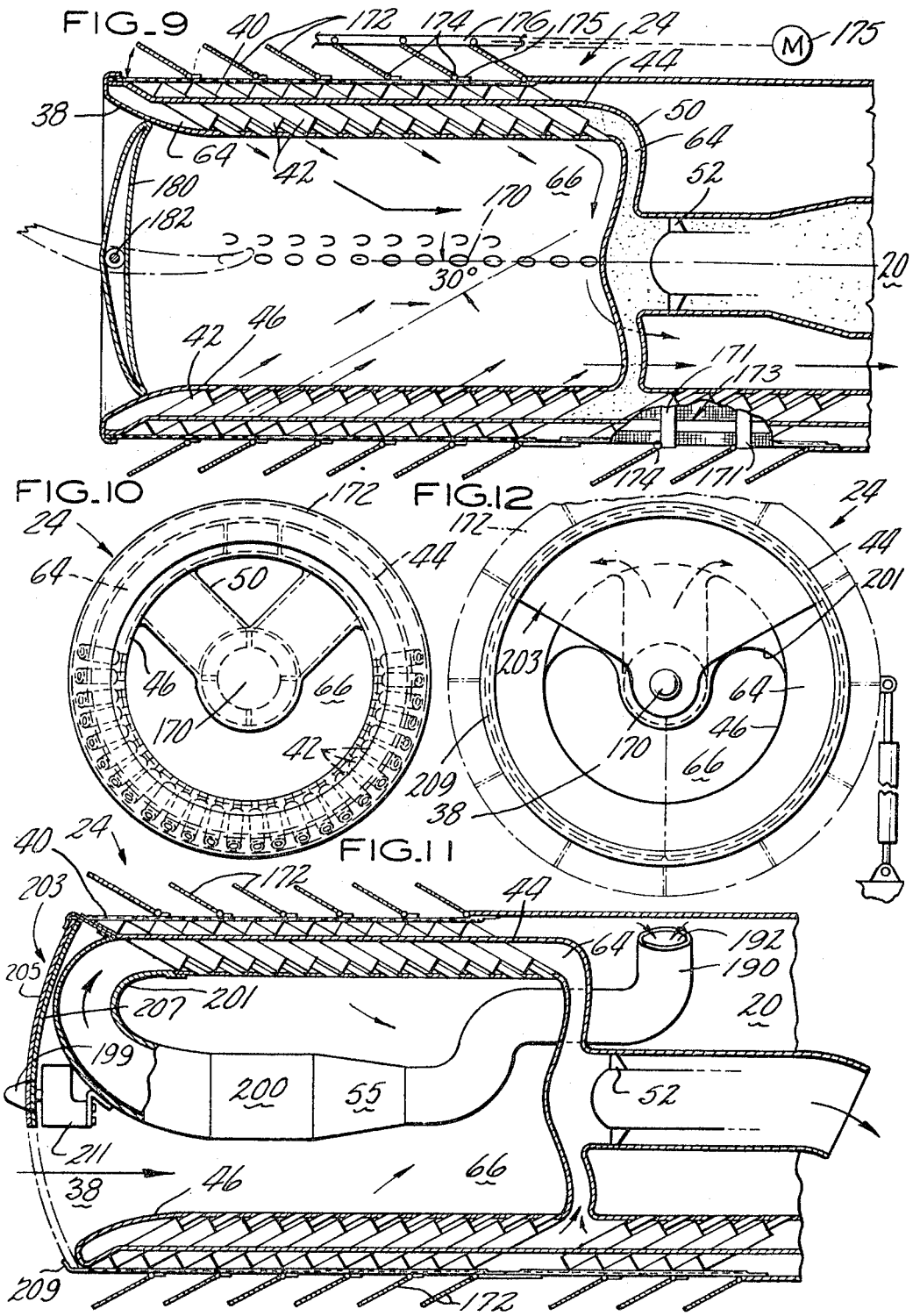

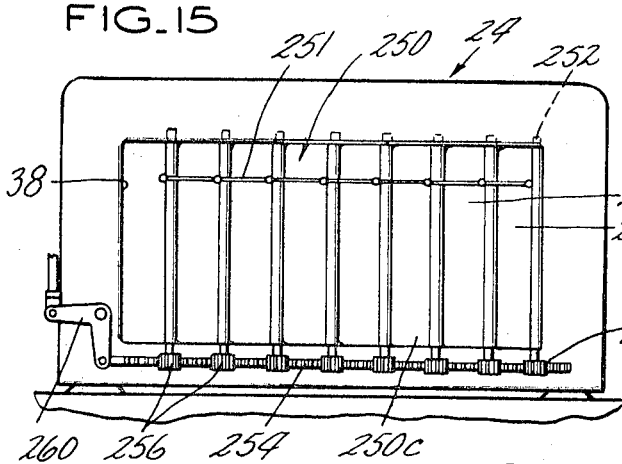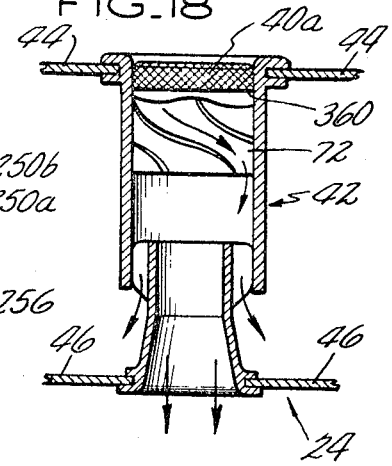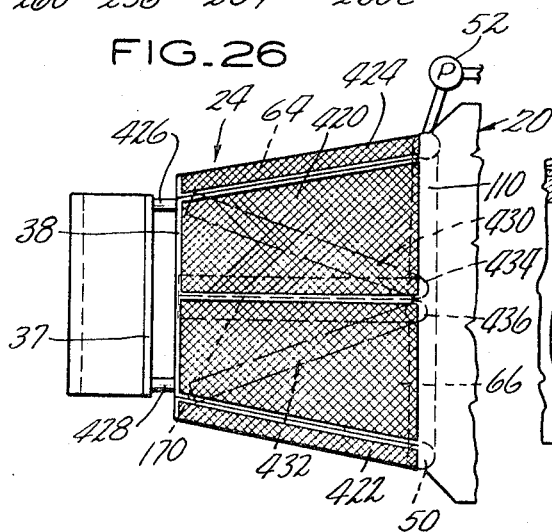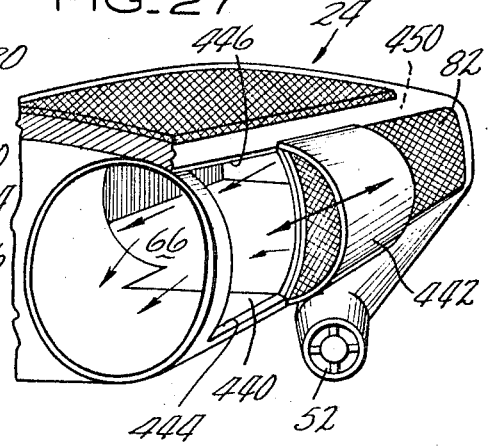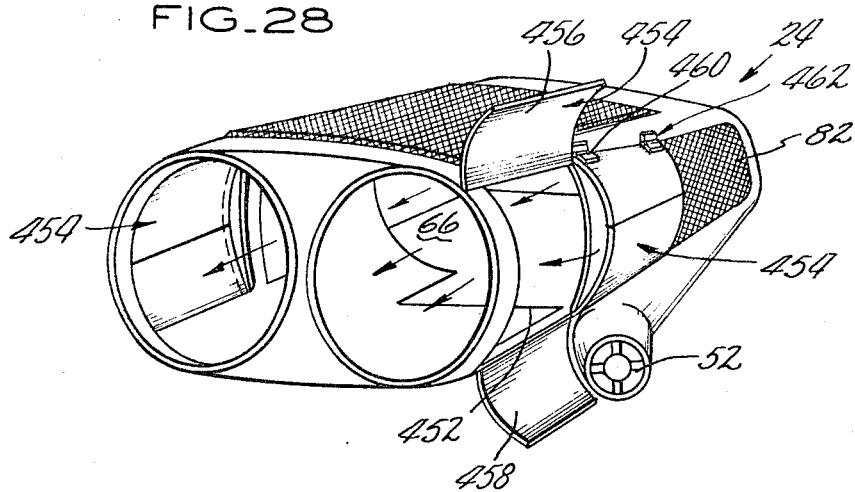

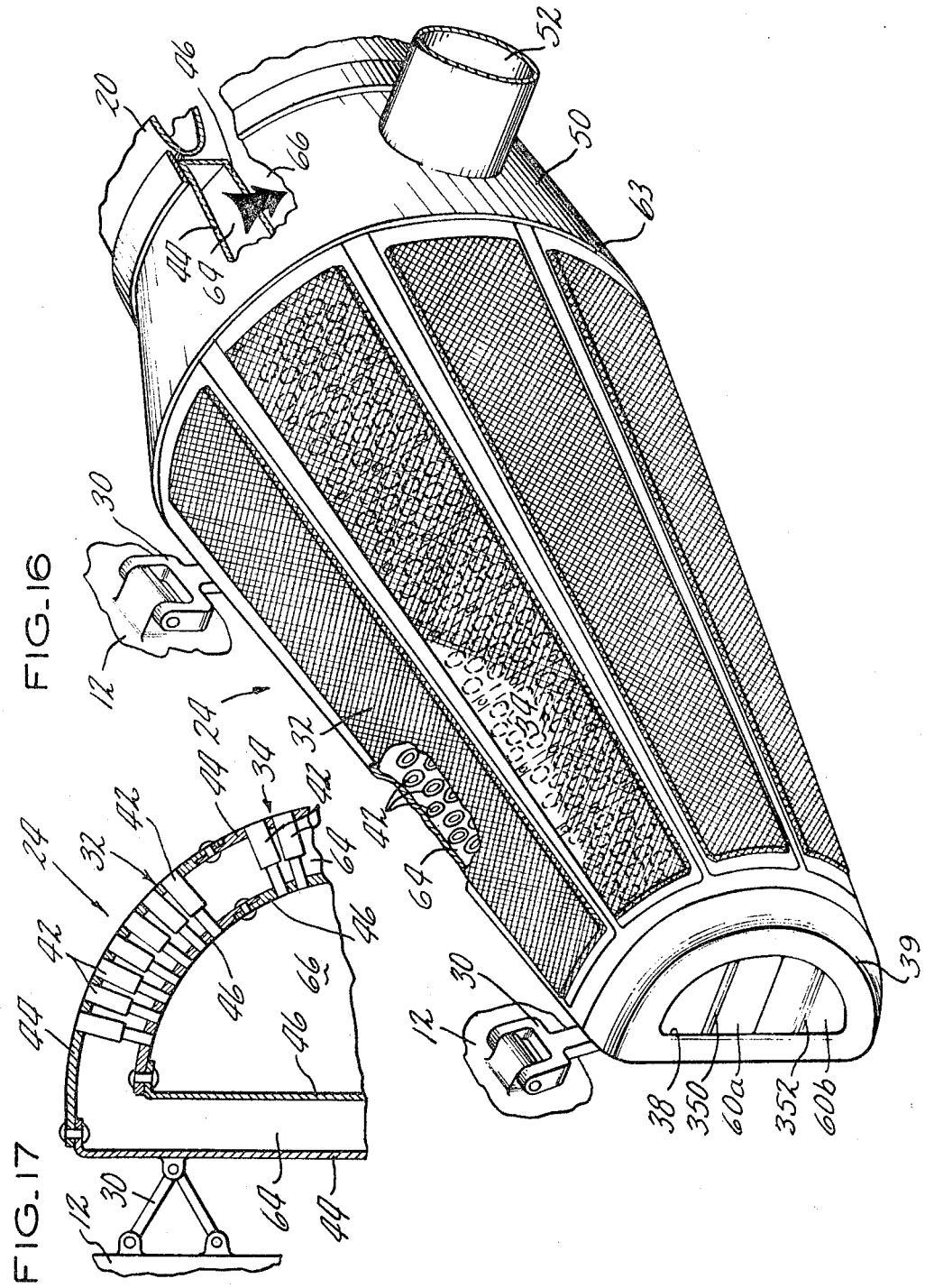

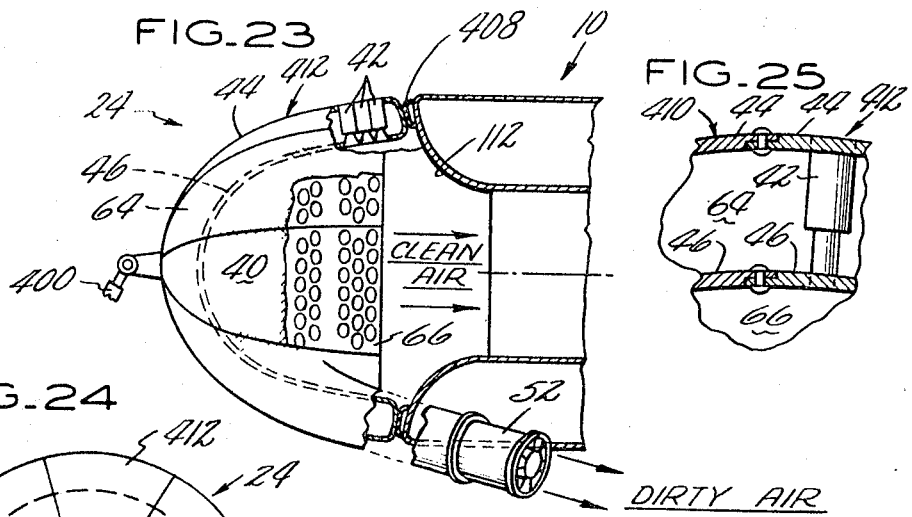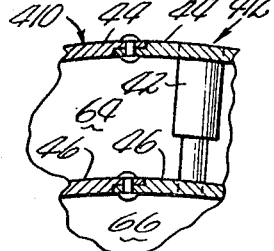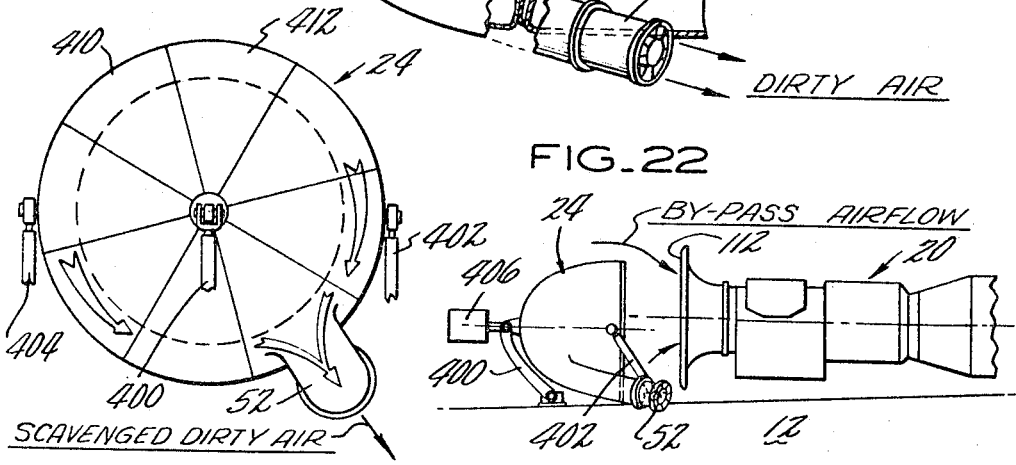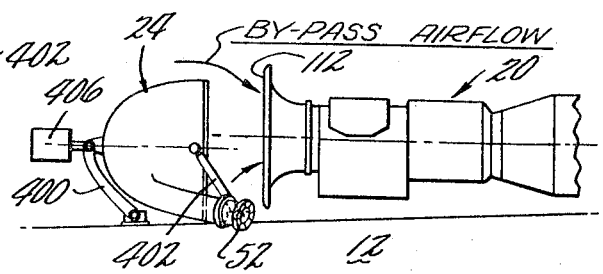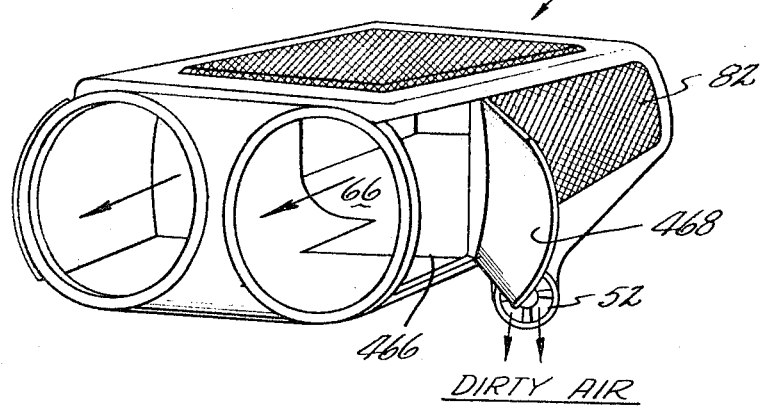

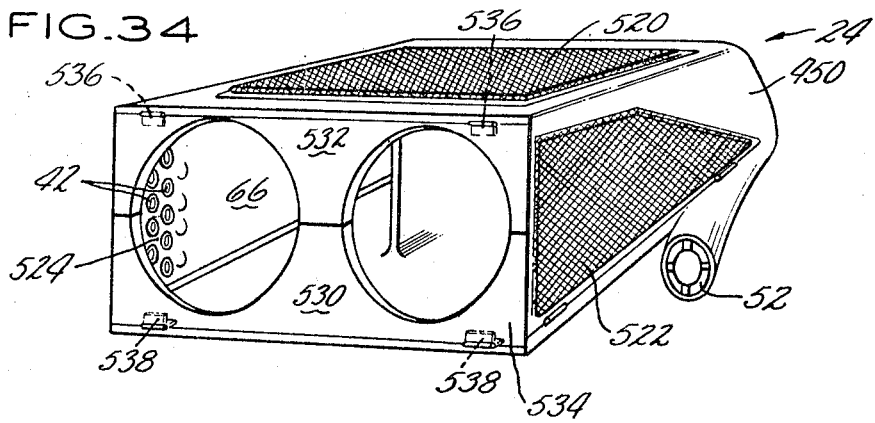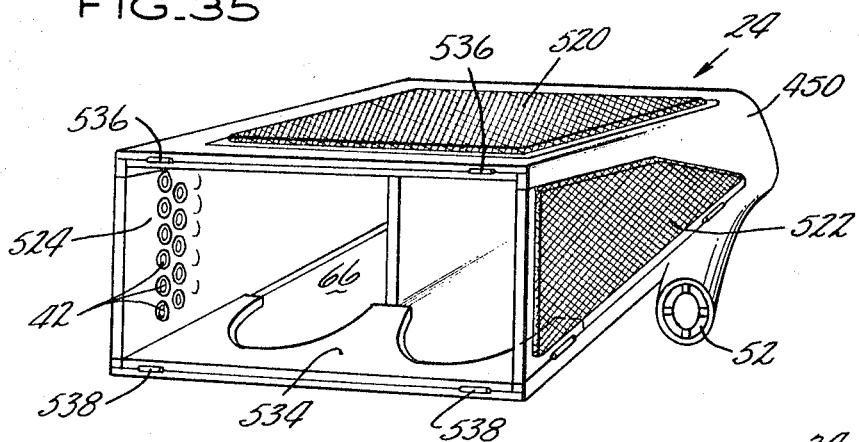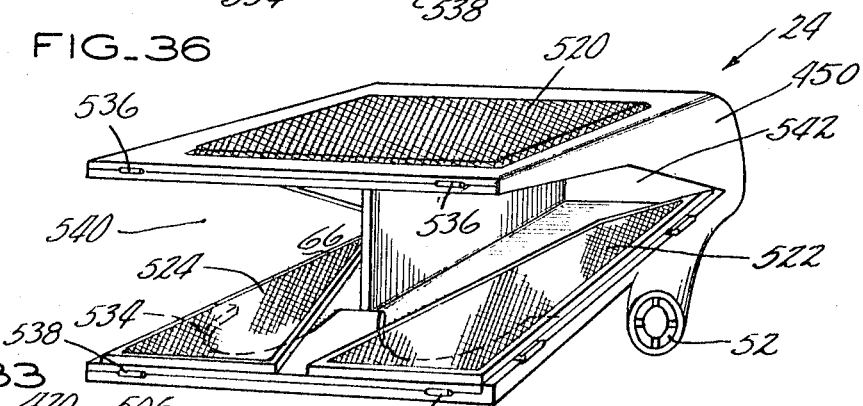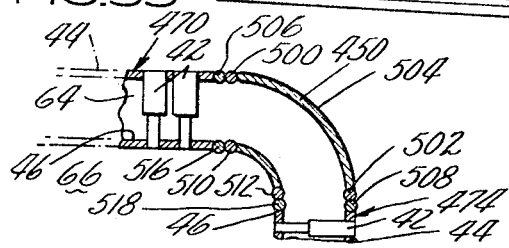

3,449,891
ENGINE INLET AIR PARTICLE SEPARATOR
Herbert N. Shohet, Norwalk, Conn., Armand F. Amelio, Yonkers, N.Y., and Richard L. House, West Haven, and John M. Kowalonek, Stratford, Conn., assignors to United Aircraft Corporation, East Hartford, Conn., a corporation of Delaware
Filed Nov. 15, 1966, Ser. No. 594,541
Int. Cl. B64c 1/14; B01d 46/48
U.S. Cl. 55—306     23 Claims

ABSTRACT OF THE DISCLOSURE

In an engine air particle separator including a plurality of selectively shaped filter panels connected by appropriately contoured connecting means to define a spaced walled member positioned forward of the engine inlet and shaped to define a passageway therethrough into the engine inlet and a chamber therebetween and having centrifugal separator tubes extending between the spaced walls, which tubes are shaped to receive particle ladened air through the outer of the spaced walls, to discharge cleaned air into the passageway and engine inlet, and to discharge separated debris into the chamber between the spaced walls for scavenge therefrom. The separator has minimum pressure loss by pass provisions.

---

This invention relates to filtration and more particularly to an engine inlet air particle separator to remove foreign particles from the air entering the inlet of an airbreathing engine and in particular an aircraft jet engine.

It is an object of this invention to teach an engine inlet air particle separator or filter in which a plurality of filter panels, comprising centrifugal separator tubes extending between spaced walls, are joined to form a passageway therewithin into the engine inlet and to form a chamber between the spaced walls of the filter panels into which particles separated from the air are deposited for scavenge therefrom.

It is still a further object of this invention to teach a separator or filter having the above passageway defining panels and also having a bypass system at the front of the passageway so that all air entering the engine must pass through the centrifugal separators when the bypass door is closed or so that ram air may enter the engine inlet directly when the bypass door is open.

It is an object of this invention to teach an engine inlet air particle separator in which, when desired, all air entering the engine must pass through one of a plurality of small, tube-type centrifugal separators which extend between spaced walls and which centrifugal separators are shaped to deposit separated particles into the chamber defined between the spaced walls.

It is still a further object of this invention to teach an engine inlet air particle separator in which the particles which are separated from the inlet air are removed by a scavenge system.

It is still a further object of this invention to teach an engine inlet air particle separator in which, when desired, the air entering the engine inlet may pass directly through bypass doors into the engine inlet, without going through the aforementioned tube-like separators.

It is still a further object of this invention to teach an engine inlet air particle separator wherein the separator assembly is positioned forward of the engine inlet and wherein a sealing means is provided between the separator assembly and the engine inlet to permit relative motion therebetween.

It is still a further object of this invention to teach an engine inlet air particle separator wherein the separator assembly is positioned forward of the engine inlet and wherein a sealing means is provided between the separator assembly and the engine inlet to permit relative motion therebetween.

It is still a further object of this invention to teach a separator wherein provisions are made for providing pressure means to determine airflow through the separator and into the engine inlet.

It is still a further object of this invention to teach an engine inlet air particle separator which is light in weight, which produces minimum pressure loss in the air passing therethrough and which presents a maximum number of small tube-like centrifugal separators through which the air entering the engine inlet may pass.

It is still a further object of this invention to teach such a separator in which the plurality of separators are formed into panels, which are joined by appropriate ducting and scavenging means so as to form a many sided duct forward of the engine through which the air entering the inlet may pass.

It is still a further object of this invention to teach an engine inlet air particle separator which is either of rectangular, circular or D-shaped cross section or any appropriate cross section to suit the contour of the airplane fuselage and the engine inlet.

It is still a further object of this invention to teach an engine inlet air particle separator wherein the separator assembly can be shifted away from the engine inlet not only to permit access to both the interior of the separator and the engine inlet for maintenance and repair purposes but also to permit engine air to enter through the separation between the separator assembly and the engine inlet through a circuitous route so as to prevent ice entry into the engine inlet.

It is still a further object of this invention to teach an engine inlet air particle separator wherein there is a spacing between the separator outlet and the engine inlet and including a fluid inflatable seal which can be either inflated to block airflow through the spacing or which can be deflated to permit airflow through the spacing.

It is still a further object of this invention to teach an engine inlet air particle separator in which foreign particles are separated from the air entering a turbine engine by a plurality of small tube-like centrifugal separators and which foreign particles so removed enter a scavenge duct system which has a scavenge blower system with suction created therein by suction units powered by air bled from the turbine engine compressor.

It is still a further object of this invention to teach an engine inlet air particle separator in which a suction system is provided to remove the separated particles and wherein the suction system is provided with signal means to indicate when the suction system is in operation.

It is still a further object of this invention to teach an engine inlet air particle separator which can be used to filter the air being directed to any number of engine inlets.

It is still a further object of this invention to teach a separator in which the aforementioned centrifugal separator tubes are grouped in spaced banks to permit better scavenge of the separated particles.

It is still a further object of this invention to teach such a separator in which the separator is supported from the aircraft fuselage to be positioned axially forward of and in alignment with the engine inlet and wherein the supporting means is fabricated to support the separator assembly in spaced relation to the fuselage surface or deck to minimize ingestion of particles which might accumulate there or be entrapped in the deck boundary layer.

It is still a further object of this invention to teach such a separator and to provide a coarse filter external of the separator tubes.

It is still a further object of this invention to teach such a separator wherein the aforementioned coarse separator is either a sheet of selective mesh covering the inlets of all separators in a particular filter panel, or wherein the coarse filter is a molded insert of selected mesh received and positioned in the inlet of each individual filter tube.

It is still a further object of this invention to teach such a separator wherein a series of individual double-walled filter panels are shaped to be connected to one another so as to form a continuous inner wall enveloped within a continuous outer wall without the requirement of additional support means.

It is still a further object of this invention to teach such a separator which includes a plurality of filter panels joined to define a compartment forward of the engine inlet and wherein at least one of the filter panels includes an aperture and wherein the separator has door means, either sliding or pivotal, to either permit or prevent atmospheric airflow into the compartment through the aperture.

It is still a further object of this invention to teach such a separator wherein at least one of the filter panels is movably connected to the remainder of the inlet compartment defining filter panels so as to be actuatable between a first position wherein the only air access to the compartment is through the centrifugal separator tubes and a second position wherein the movable filter panel moves with respect to the remaining filter panels to create an air inlet aperture into the compartment.

It is still a further object of this invention to teach such a separator which is either rectangular or D-shaped in cross section and which is shaped to increase in cross sectional area between the inlet thereof to a selected point in the length thereof and to decrease in cross sectional area from this selected point to the outlet thereof.

It is still a further object of this invention to teach such a separator wherein at least one filter panel comprises spaced walls defining a chamber therebetween and having a plurality of centrifugal separator tubes extending therebetween and which separator is movable between a first position wherein airflow to the engine is permitted therearound and a second position wherein airflow to the engine is permitted only therethrough.

It is still a further object of this invention to teach an engine inlet air particle separator which is adapted to attach to the air inlet of a turbine engine and which reduces engine noise.

Other objects and advantages will be apparent from the specification and claims and from the accompanying drawings which illustrate an embodiment of the invention.

FIG. 2 is a perspective showing, partially broken away, of an engine inlet air particle separator to show the construction thereof.

FIG. 3 is similar to FIG. 2 but shows a different type of bypass door and a different type of scavenge system.

FIG. 4 is a side view of the engine inlet air particle separator connected to an engine inlet and supported from the aircraft fuselage.

FIG. 5 is a showing of a fluid-inflatable seal positioned to seal the gap between the separator and an engine inlet.

FIG. 6 is a cross-sectional view through a portion of the engine inlet air particle separator to show the spaced outer and inner walls, the coarse filter exterior thereof, the chamber therebetween and one of the tube-like centrifugal separators in greater particularity.

FIG. 7 is a cross-sectional view of the engine inlet air particle separator shown in FIG. 4 to show the double wall construction in greater particularity.

FIG. 8 is a cross-sectional showing of the type of bypass door illustrated for use with the engine air inlet particle separator in FIGS. 1 and 2.

FIG. 9 is a cross-sectional showing of a modification of the engine inlet air particle separator.

FIG. 10 is a front view of the engine inlet air particle separator shown in FIG. 9.

FIG. 11 is a showing of another version of the engine inlet air particle separator with provisions for anti-icing by means of heat application to the inlet air.

FIG. 12 is a front view of the engine inlet air particle separator shown in FIG. 11.

FIGS. 13 and 14 are side views of a modification of my engine inlet air particle separator which is movable with respect to the engine inlet so as to be immediately adjacent thereto as shown in FIG. 13 or spaced substantially therefrom as shown in FIG. 14.

FIG. 15 is a perspective showing of another form of bypass doors which may be used with my engine inlet air particle separator and which are of the venetian blind type.

FIG. 16 is a perspective showing of a modification of the engine inlet air particle separator which is of D-shaped cross section.

FIG. 17 is a cross-sectional showing of a portion of the separator shown in FIG. 16 to illustrate the connections between the spaced inner and outer walls, the chamber defined therebetween, the passageway or compartment defined therewithin, and the centrifugal separator tubes extending therebetween.

FIG. 18 is a cross-sectional showing of a centrifugal separator tube using a coarse filter insert in the air inlet thereof.

FIG. 19 is a cross-sectional showing of a pressure of the separator adapted for use with an air-breathing indicator used in the scavenge duct system of the separator to indicate when the scavenge blowers are operating.

FIG. 22 is a side view of a dome-shaped modification of the engine inlet air particle separator shown supported from the fuselage in a position spaced forward of an air-breathing engine.

FIG. 23 is an enlarged cross-sectional showing of the dome-shaped separator shown in FIG. 22 but with the separator sealably engaging the engine inlet.

FIG. 24 is a front view of the separator shown in FIGS 22 and 23.

FIG. 25 is an enlarged cross-sectional showing of the connection between the inner and outer walls of the dome-shaped separator of FIGS. 22–24.

FIG. 26 is a top view of another modification of the engine inlet air particle separator having filter panels forming the four peripheral walls thereof and two additional filter panels pivotally mounted within the peripheral wall panels.

FIGS. 27, 28 and 29 illustrate modifications of the engine inlet air particle separator including a plurality of filter panels joined to form a filter cage with a bypass aperture therein and including various bypass door arrangements to either block or permit flow through the bypass aperture, FIG. 27 shows a translatable door, FIG. 28 shows double, two-piece pivotal doors, and FIG. 29 shows a one-piece pivotal door.

Figure 30:
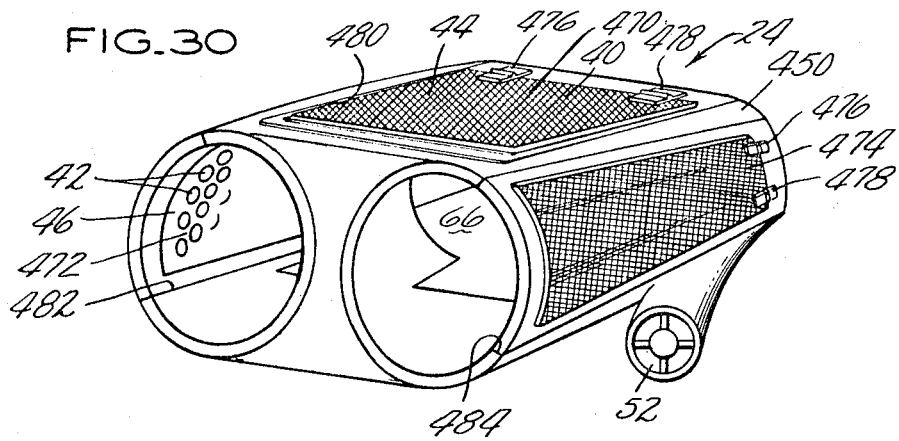
Figure 31:
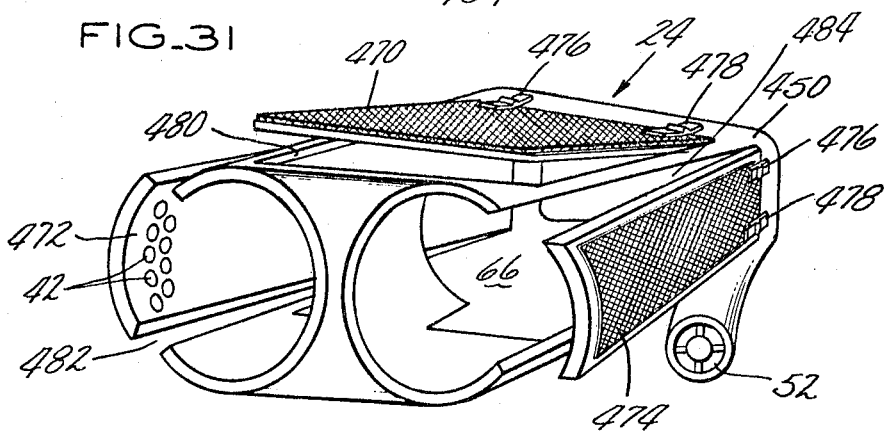
Figure 32:
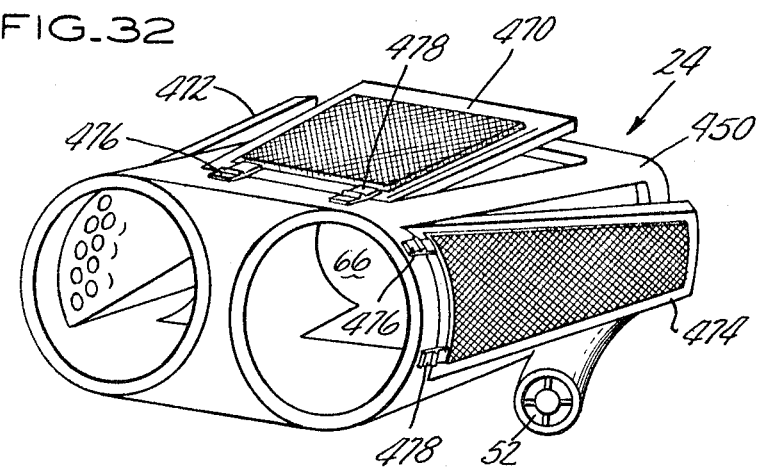

FIGS. 30, 31 and 32 show versions of the engine inlet air particle separator in which one or more filter panels are pivotally supported to be movable between a first position wherein the filter panel defines part of the filter cage and a second position wherein the filter panel is spaced from a filter cage bypass aperture to permit airflow into the filter cage through the bypass aperature, FIG. 30 shows all filter panels in their closed positions to demonstrate filtration mode of operation of the filter cage, FIG. 31 shows the filter cage in the bypass mode of operation with the movable filter panels pivotally connected at their forward ends to the forward end of the cage, and FIG. 32 shows the filter cage in the bypass mode of operation and with the movable filter panels pivotally connected at their after ends to the after end of the filter cage.

FIG. 33 is an enlarged cross-sectional shown illustrating one of the corners of the filter cage in the FIGS. 30–32 construction to illustrate the sealable connection between the cage frame and the movable panels.

FIGS. 34, 35 and 36 show an embodiment of the engine inlet air particle separator in which the rear wall of the filter cage is pivotable between a filtration and a bypass position and wherein both side walls of the filter cage include filter panels which are pivotably mounted to be movable between filtration and bypass position, wherein FIG. 34 illustrates the filter cage in the filter mode of operation, FIG. 35 illustrates the filter cage with the rear wall in bypass mode of operation, and wherein FIG. 36 illustrates the filter cage with both the rear wall and the side wall filter panels in bypass mode of operation.

Figure 1:
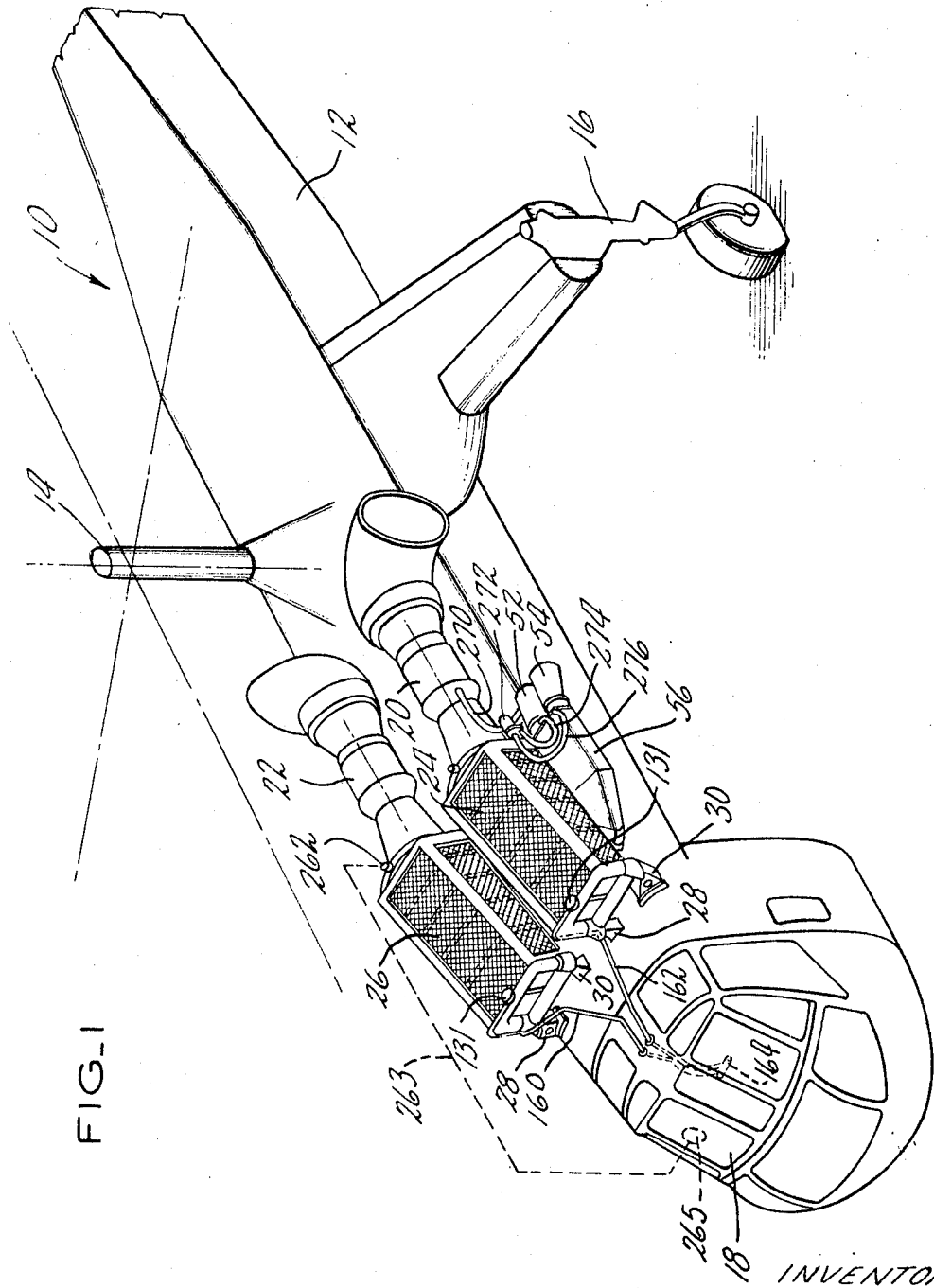
FIG. 1 is a showing of a modern aircraft such as a helicopter showing two of the engine inlet air particle separators in position.

Referring to FIG. 1 we see modern aircraft 10 which is illustrated to be of the helicopter type and which includes fuselage 12, main rotor assembly 14, at least three landing gears such as 16, and pilot compartment 18. Aircraft 10 is powered by engines 20 and 22, which are attached by appropriate transmission mechanism, such as the type best shown in U.S. Patent No. 2,979,968 to drive both the main rotor assembly 14 and the tail rotor assembly (not shown). Engines 20 and 22 are preferably of the turbine type which consist of a compressor section, a combustion chamber section, and a turbine section in axial alignment which is best shown in U.S. Patents Nos. 2,711,631 and 2,747,367 and which may also consist of a free turbine downstream thereof. Two engine inlet air particle separators 24 and 26 are shown in FIG. 1, but it should be borne in mind that one such separator could have been used. For purposes of illustration, separator assembly 24 only will be described, but separator assembly 26 is identical therewith except possibly to be made allochiral therewith in installations requiring such an arrangement. Separator assembly 24 is attached to the aircraft fuselage 12 by any appropriate mounting means such as mounts 28 and 30 and there are preferably similar mounts at the after end of separator 24 so that the separator is attached firmly to the fuselage 12 at at least four points. Engine mounts 28 and 30 are selected to support separator assemblies 24 and 26 a distance from, or in spaced relation to fuselage 12 to minimize ingestion of foreign particles which might accumulate there or be entrapped in the fuselage boundary layer.

As best shown in FIG. 2, the engine inlet air separator assembly, duct or filter cage 24 comprises a plurality of panel members such as top panel 32, side panel 34 and a similar side panel (not shown) on the opposite side from side panel 34. A bottom panel could also be used if desired. The panel members are joined to define a double-walled duct with a passageway or compartment 66 therewithin. A fifth panel could be used at the front of the separator assembly, if desired, but it is considered preferable to place a bypass door unit 36 in aperture 38 at the front end of the separator assembly 24. Bypass door unit 36 is positioned in aperture 38 of fairing member 29 (see FIG. 3) to completely block off aperture 38 when the doors are closed so that all air entering the engine 20 must pass through one of the many filter panels such as 32 or 34 or, if air filtration is not needed or if airflow blockage is encountered in the separator panels, the bypass doors 36 may be opened so that air may enter the engine through aperture 38 in a direct-ram fashion since aperture 38 is preferably spaced axially forward of and in axial alignment with the engine inlet. The panel members such as 32 and 34 are of similar basic construction and comprise an outer coarse filter screen member 40 or other large particle filtration means and each panel includes a plurality of small tube-like centrifugal separators 42 which extend between and are positioned by an outer wall 44 and an inner wall 46. The filter panels (such as 32 and 34) are connected such that the walls 44 and 46 constitute a double-wall construction so as to define a scavenge duct system 50 connected to and communicating with scavenge blowers 52 and 54. A similar set of scavenge blowers may be located on the opposite side of the separator assembly 24 if desired but are not included in this design. Ducting or manifold 56 connects the scavenge duct system 50 to the scavenge blowers 52 and 54.

Still referring to FIG. 2, it will be noted that a single engine inlet air particle separator 24 is positioned in front of a single engine 20, whereas FIG. 3 illustrates an embodiment in which a single engine inlet air particle separator 24 is positioned in front of and services two engines 20 and 22. FIG. 3 is otherwise similar to FIG. 2 except that the bypass door 60 is of a different type. Bypass door 60 is hinged about pivot arm 62, which is pivotally supported in fairing 39 and which may be actuated in any convenient way from the pilot compartment 18, such as by rack 61 which is reciprocated by pilot-operated motor 63 and which engages and turns gear 65, attached to shaft 62 so as to swing bypass door open either inwardly or outwardly to any desired inlet position. In addition, the FIG. 3 embodiment uses a single scavenge blower 52 in duct 56.

Viewing FIG. 4 we see a side view of the engine air inlet particle separator 24 which illustrates panel member 34 and scavenge duct system 50. The rearward or after end of separator assembly 24 is attached to or includes cylindrical member 114. Seal member 118 is mounted on engine inlet ducting 112 with its arcuate inner surface 120 in sealing engagement with member 114 which is coated with a low friction material such as nylon or Teflon. In this fashion, either axial or circumferential relative motion, is permitted between the separator assembly 24 and the engine 20. This is deemed necessary because many engines are mounted so that some circumferential motion thereof is present. In the design the seal is also thus constructed so that no influence will be exerted on the torque indicating system described in U.S. Patent No. 3,135,487 and utilized on the aircraft 10.

While a particular type of seal arrangement is shown in FIG. 4, an alternate type of seal arrangement is shown in FIG. 5. In the FIG. 5 arrangement the separator assembly 24 is again placed in front of engine 20 so that engine inlet 112 envelops cylindrical surface 114 of outlet 110 of separator 24 and wherein circuitous passage 111 is defined between separator assembly 24 and engine inlet 112. An inflatable seal ring 113 is supported from engine inlet 112 and may be inflated by pressurized fluid from pressurized source 115, which is connected by ducting 117 to ring seal 113. Valve means 119, which is pilot operated through solenoid 121, is located in ducting 117 and is preferably of the three position variety to either admit pressurized fluid into inflatable seal ring 113 to cause it to assume its FIG. 5 phantom position and thereby block airflow through circuitous passage 111 or to bleed pressure from inflatable seal ring 113 so that the seal ring 113 will collapse as shown in solid lines in FIG. 5 to permit airflow through circuitous path 111. The advantage of the FIG. 5 construction is that passage 111 forms a bypass passage into engine 20 around separator assembly 24 so that the atmospheric air may enter the engine without passing through the separator and, most importantly, because of the circuitous route defined by passage 111, the atmospheric air in passing therethrough will encounter several changes in direction so that large particles, such as ice particles, will be removed from the air entering the engine.

As best shown in FIG. 4, banks of separator tubes 42, such as banks 300, 302 and 304, are separated to define passages 306 and 308 therebetween to permit better scavenge of the separated particles. Due to this spacing, the separated particles have to travel but a short distance in between the tubes to get to the clear passages 306 and 308.

Still viewing FIG. 4, it will be seen that pressure probe unit 262 is supported from separator assembly 24 and projects into passageway 66. Appropriate instrumentation, such as line 263 and pressure gauge 265 transmits pressure readings from pressure probe unit 262 to the pilot in pilot chamber 18, preferably in the form of a warning light. The purpose of pressure probe 262 is to warn the pilot that airflow to the engine through the passageway 66 has reduced in pressure, possibly due to blockage in the filter panels such as 32 and 34, so that the pilot may open the bypass doors such as 36 and 60. FIG. 4 also illustrates the fashion in which separator assembly 24 is supported in spaced relation to fuselage 12 by supports 30.

Separator tubes 42 and the makeup of all the filter panels shown herein are shown in greater particularity in FIG. 6. It will be noted that separator tubes 42 are positioned inward of coarse filter screen member 40 and extend between outer wall 44 and inner wall 46 of a panel member such as 34. Walls 44 and 46 are spaced so as to form chamber 64 therebetween. Chamber 64 is joined to scavenge duct system 50 as described hereinafter. While filter members 42 may be any type of particle separators, centrifugal separators are preferred and the type illustrated is of the tube-type variety consisting of an outer member 68 and an inner member 70 joined or spaced by web member 75. Outer member 68 includes a plurality of swirl vanes 72 in one or more banks. By viewing FIG. 6 it will be noted that the air which enters separator assembly 24 is first passed through screen member 40, which screen member will prevent any large particles from flowing therethrough. After passing through screen member 40, the air must then pass through one of the centrifugal separator tubes 42 since there is no other flow path joining the atmosphere exterior of the separator assembly 24 and engine inlet passageway 66 when bypass doors 36 or 60 are closed. In passing through centrifugal separator 42, the air enters tube inlet 69 and the presence of fixed swirl vanes 72 will cause the foreign particles, which are heavier than air, to separate out of the air by being centrifugally spun outwardly against the wall of outer member 68, while the clean air passes through the central portion of the separator tube assembly 42. The clean air will accordingly enter inner member 70 to be discharged therefrom into passageway 66 through primary tube exit 71 while the foreign particles which have been separated by the action of the swirl vanes 72 will enter chamber 64 through secondary annular outlet passage 74.

As best shown in FIG. 7, separator assembly 24 is preferably formed by attaching top panel member 32 and bottom panel member 80 to side panel members 82 and 34. Any or all panel members 32, 34, 80 and 82 may include the plurality of centrifugal separator tubes such as 42 but, it may be deemed desirable to leave bottom panel member 80 completely hollow for purposes of better scavenge of the separated particles. It will be noted that separator assembly 24 is constructed in cross section of two spaced walls such as 44 and 46 of panel 32, 84 and 86 of panel 34, 90 and 88 of panel 80, 92 and 94 of panel 82. The various panels are joined by a row of screws or nuts and bolts, for example, outerwall member 44 is joined to outer wall members 92 and 84 by nut and bolt rows 100 and 102, while inner wall member 46 is joined to inner wall members 94 and 86 by bolt and nut rows 104 and 106. Outer walls 44, 84, 90 and 92 are connected to form outer duct 45 while inner walls 46, 86, 88 and 94 are connected to form inner duct 95. Outer and inner ducts 45 and 95 define chamber 64 therebetween and inner duct 95 defines passageway or compartment 66 therewithin. Other desired spacing supports may also be used, but are not required in the design. Nut and bolt rows 120 and 130 connect scavenge duct member 56 to wall member 92 and to bottom wall member 90. In similar fashion nut and bolt rows 132 and 134 join inner walls 94 and 86 to inner wall 88. It will therefore be seen that any foreign particles separated from the air passing through centrifugal separators 42 will enter chamber 64 and be scavenged therefrom through scavenge manifold 56 by the action of scavenge blowers such as 52 and 54.

As is best shown in FIG. 19, a pressure indicator 267 is provided for the scavenge system and is preferably located on the bottom of scavenge manifold 56 to indicate whether suction exists in the scavenge duct system 50, which is indicative of whether scavenge blowers 52 and 54 are operating. Pressure indicator 267 may consist of a gaily colored flanged piston 269 which is retained in tube member 271 including fitting 273 which is threadably attached to manifold 56. Piston 269 will project through the end of tube 271 and be visible when there is no suction within manifold 56 or piston 269 will be sucked into the tube 271 when sufficient suction exists within manifold 56. In this fashion, it can be determined visually whether or not there is sufficient suction within the scavenge duct system 50 by noting the position of piston 269. Other known means such as a pressure gauge may be utilized and may communicate a signal to the cockpit if so desired.

The type of bypass door illustrated in FIGS. 1 and 2 is illustrated in greater particularity and in cross section in FIG. 8. It will be noted by referring to FIG. 8 that the door member 36 comprises a central swivelling panel member 131 having oppositely directed arms 133 and 135 pivotally connected to plate members 136 and 138. Swivelling member 131 is pivotally connected to pivot pin 140. With swivel member 131 positioned as shown in FIG. 8, plate members 136 and 138 engage groove-like members 150 and 152 in aperture 38 of fairing member 39. FIG. 8 depicts bypass door 36 in its closed position. When swivel member 131 is pivoted from its FIG. 8 position to a fore-and-aft position, plate members 136 and 138 will move and become free of groove members 150 and 152 so that plates 136 and 138 may be blown open to open a passageway through aperture 38 to permit ram air to enter compartment 66 and hence to move directly into the inlet of the engine 20. For sealing reasons, strip 145 may be connected by adhesive or any suitable means to plate members 136 and 138 to cover the member 131.

As best shown in FIG. 1, cable members 160 and 162 are connected to swivel member 131 and to handle 164 in the pilot's compartment 18 so as to permit the pilot to actuate the bypass doors 36.

As best shown in FIG. 15, the bypass door 250 located in inlet aperture 38 of separator assembly 24 may be of the venetian-blind type wherein each panel member such as 250a is pivotably connected to separator assembly 24 at aperture 38 by some mechanism such as pivot rod 252 and is shaped so that it slightly overlaps the adjacent panel member 250b when in its closed position. Each of the panel members of bypass door 250 is so fabricated. Bypass door 250 may be actuated to its open position by causing each panel member, such as 250a, to pivot about pivot rod 252 by the action on rack 254 and pinion 256, which is attached to pivot rod 252. Rack 254 may be caused to actuate in any convenient manner, for example by means of pilot actuated crank arm 260. In the alternative, rack 254 could coact with a single pinion such as pinion 256 of panel member 250a and the remaining panel members, such as 250b and 250c etc. could be caused to move in synchronization with panel member 250a by arm member 251 which is pivotally attached to each panel member. Still another embodiment of the engine inlet air particle separator is shown in FIGS. 9 and 10. This particular embodiment is preferably of circular cross section and the same reference numerals will be used in describing it as were used in describing the earlier constructions. By viewing FIGS. 9 and 10 it will be seen that the separator assembly 24 comprises outer wall 44 and inner wall 46, both of which are preferably of circular cross section and concentric about axis 170. A plurality of centrifugal air separator tubes 42 extend between wall members 44 and 46 such that air passes therethrough in entering engine inlet passageway or compartment 66. As in the earlier described embodiment, outer wall 44 and inner wall 46 cooperate to form chamber 64 which receives the separated particles passing through centrifugal tube separators 42. Compartment 64 is subjected to a scavenging action by scavenge blower 52 in scavenge duct system 50. Either a screen member 40 or a screen member covered by a plurality of cowl flap members 172 may envelop the centrifugal separator tubes 42. Cowl members 172 may be pivotally connected to support rings 171 of harness 173 and caused to pivot to an open position about their pivot points 174 by the motion of rod member 176, which is pivotally attached to the outer end of each cowl flap 172 and which is actuated forwardly or rearwardly by any appropriate mechanism such as a manually operated lever or any mechanized means such as pilot operated motor 175. It will be seen in the FIGS. 9 and 10 constructions that the centrifugal separator tubes 42 are canted about 30° with respect to axis 170 to permit a ram effect with respect to the air passing thereinto as the craft moves in a forward direction. A bypass door 180 is mounted across the inlet 38 of separator assembly 24 and may be pivoted about pivot axis 182 to its solid line position to block flow through aperture 38 into compartment 66 and thereby cause all air entering engine 20 to pass through centrifugal separator tubes 42. Bypass door 180 may also be actuated by any convenient mechanism, such as the pilot operated rack and pinion shown in FIG. 3, to its fully open phantom line position shown in FIG. 9. With bypass door 180 open, ram air may pass through aperture 38 and compartment 66 directly into the inlet of engine 20, since the engine and separator assembly are aligned and are preferably coaxial. In operation, the separator assembly shown in FIGS. 9 and 10 operates the same way as the separator assembly 24 shown in the earlier figures already described in that the air enters centrifugal separators 42 and the clean air passes through the center thereof into compartment 66 and thence into the engine 20 and, the foreign particles separated by centrifugal separators 42 pass into chamber 64 and are drawn therefrom in suction or scavenge fashion by blower 52.

If hot air deicing to the engine inlet air particle separator is desired, the construction shown in FIGS. 11 and 12 could be used. This construction is the same as the FIGS. 9 and 10 constructions with respect to the separator assembly 24 except that heated air will be passed through chamber 64 and over the centrifugal tubes 42. The air to be heated enters duct 190 through inlet 192 due to the action of suction blower 52 and possibly an auxiliary blower 55 and is heated by anti-icing heater mechanism 200 and then passes through duct 201 and chamber 64 to heat the centrifugal separator tubes 42 to prevent icing thereof. Heater 200 may be eliminated if duct 90 is attached to the compressor section of engine 20 so that the engine compressor pumps heated and pressurized air into duct 190 and thence through chamber 64 of the FIGS. 11–12 embodiments for anti-icing purposes. The FIGS. 11–12 constructions also differ from the FIGS. 9–10 constructions in that a different type of bypass door mechanism is used. The bypass door mechanism 203 of the FIGS. 11–12 constructions include two or more rotatable door sections such as 205 and 207 which are mounted to be rotated in opposite direction by shaft and gear mechanism 199 which is driven by pilot operated electric motor 211. This bypass door system 203 is particularly advantageous in the FIGS. 11–12 constructions wherein the inlet aperture 38 to compartment 66 is substantially kidney-shaped as best shown in FIG. 12. Doors 205 and 207 may be rotated in opposite directions to the overlapping position illustrated in FIGS. 11 and 12 and these doors may also be rotated in opposite directions to completely cover kidney-shaped aperture 38 of the FIGS. 11–12 constructions. The outer periphery of rotatable doors 205 and 207 are received in and guided by peripheral track member 209.

While the blower units 52 and 54 of the scavenge system may be operated in any conventional manner, such as by electrical motors, it is proposed herein, as best shown in FIG. 1 to bleed compressed air from one of the jet engines, such as 20 through lines 270, whenever pilot operated solenoid valve 272 is open, and then through lines 274 and 276 to impinge upon the blades 49 (FIG. 3) of the turbine portions 51 of blower units 52 and 54.

While scavenge blowers are preferably used as described with the separator assembly, it is also possible to operate the separator assembly by any other air moving means such as an ejector. It is also possible to use the separator assembly 24 without scavenge blowers, or air moving means, but at a lower efficiency.

Referring to FIGS. 13 and 14, we see an embodiment of the engine inlet air particle separator which is mounted on fuselage 12 so as to be movable with respect to the inlet of engine 20 between the FIG. 13 position wherein the separator assembly 24 is positioned to be in sealing engagement with engine 20 by the action of a seal ring 200 and the FIG. 14 position wherein a substantial gap 202 exists between the inlet of engine 20 and separator assembly 24. Separator assembly 24 is caused to move as just described by pilot operated hydraulic cylinder-piston mechanism 204, which is pivotably attached to fuselage 12 at pivot point 206 and to collector assembly 24 at pivot point 208. Link members 210 and 212 are each pivotably connected to the fuselage at pivot points 214 and 216, respectively and to collector assembly 24 at points 218 and 220, respectively. A bypass door arrangement of any type, but which is illustrated to be similar to member 60 of the FIG. 3 construction, is pivotably mounted in the inlet aperture 38 of the collector assembly 24. In all other respects collector assembly 24 is fabricated in the same fashion as the collector assembly embodiments illustrated in FIGS. 2 and 3 described in full particularity above.

In operation, the FIG. 13, 14 engine inlet particle separator operates so that when the particle separator 24 is in its FIG. 13 position with respect to engine 20 and bypass door 60 blocks off separator inlet aperture 38, all air entering engine 20 must pass through the centrifugal separator tubes 42 of the filter panels such as 34 and this can be described as the complete filtration mode of operation. When the collector assembly 24 is in its FIG. 13 closed position with respect to engine 20 and bypass door 60 is open as shown in FIG. 13, atmospheric air may enter engine 20 in ram fashion directly through inlet aperture 38 and compartment 66 of separator assembly 24. This mode of operation could be described as the filtration bypass mode without deicing. When collector assembly 24 is in its FIG. 14 open position with respect to engine 20, and bypass door 60 is in its FIG. 14 closed position, atmospheric air may enter engine 20 through gap 202 formed between engine 20 and collector assembly 24. During flight operation, since the dimensions of the after end of separator assembly 24 are larger than the dimensions of the inlet of engine 20, it will be necessary for atmospheric air to follow a circuitous route wherein the air first passes around filter assembly 24, then downwardly and into gap 202 and then rearwardly into the inlet of engine 20. This circuitous route causes the atmospheric air entering inlet 20 to make substantially right angle turns so that all large objects, including ice particles, will be filtered from the air due to their failure to make these turns with the air. This may be described as the unfiltered mode of operation with anti-icing.

FIGS. 16 and 17 depict another modification of the engine inlet air particle separator which is of D-shaped cross section and adapted to be used with a D-shaped engine inlet. The FIGS. 16–17 constructions are similar to the earlier described constructions in that all air entering the engine may be caused to pass through centrifugal separator tubes such as 42 which extend between the double walls 44 and 46 of filter panels such as 32 and 34, each of which panels is connected as previously described to scavenge duct system 50. The filter panels 32 and 34 coact with scavenge duct system 50 to define inlet compartment 66 to the engine 20. Filter panels 32 and 34 are fabricated in the fashion shown in FIG. 6 to include outer wall 44 and inner wall 46 which define chamber 64 therebetween. Suction blower mechanism 52 is connected to chamber 64 by scavenge ducting 50 and operates to remove separated particles from chamber 64. A bypass door is placed in aperture 38 of inlet fairing 39 at the forward end of the filter or separator assembly 24 and is actuatable to either block aperture 38 to cause all air entering the engine to pass through centrifugal separator tubes 42 or to permit ram air to enter the engine directly through aperture 38 and compartment 66. The bypass doors comprise two pivotable members, namely, member 60a, which is pivotable about pivot axis 350 and member 60b which is pivotable about pivot axis 352. Bypass doors 60a and 60b are shaped to occupy one half of the D-shaped inlet aperture 38 of FIG. 15 so that when both doors are in their illustrated closed position, they cooperate to form a D-shaped door in D-shaped inlet aperture 38. Panels 32 and 34 and scavenge duct system 50 are shaped so that separator assembly 24 is of D-shaped cross section. The filter panels such as 32 and 34 may be either flat or may be formed to have curved inner and outer walls 44 and 46. The FIGS. 16-17 separator assembly 24 is supported in spaced relation from fuselage 12 by any convenient connecting means 30.

It wil be noted by viewing the FIGS. 16-17 constructions that the cross-sectional area of filter assembly 24 increases in a downstream direction between inlet aperture 38 and some pre-selected station such as station 63 in FIG. 16, and then decreases in cross-sectional area in a downstream direction between station 63 and the outlet of filter assembly 24. The same increase and then decrease in cross-sectional area is prevalent in the FIGS. 2-4 constructions since, as best shown in FIG. 4, the maximum cross-sectional area across filter assembly 24 occurs at station 63 so that the cross-sectional area of filter assembly 24 increases between the inlet thereof and station 63 and decreases between station 63 and the outlet thereof. This cross-sectional area variation is desirable in that it serves to slow down the air passing through the filter assembly 24 and thereby minimize pressure drop through the compressor section of the turbojet engine into which the air is being passed.

While the large particle filter has been depicted as a large area screen member 40 covering the outer wall 44 of the double walled filter panel, such as 32, a saving in weight may be realized by fabricating the large particle filter element as a molded screen insert 40a as shown in FIG. 18. Each centrifugal separator tube 42 would have such a molded screen insert 40a of circular cross section inserted therein upstream of swirl vanes 72 and may be fabricated to be sealable thereagainst at ring shoulder 360.

Figure 20:
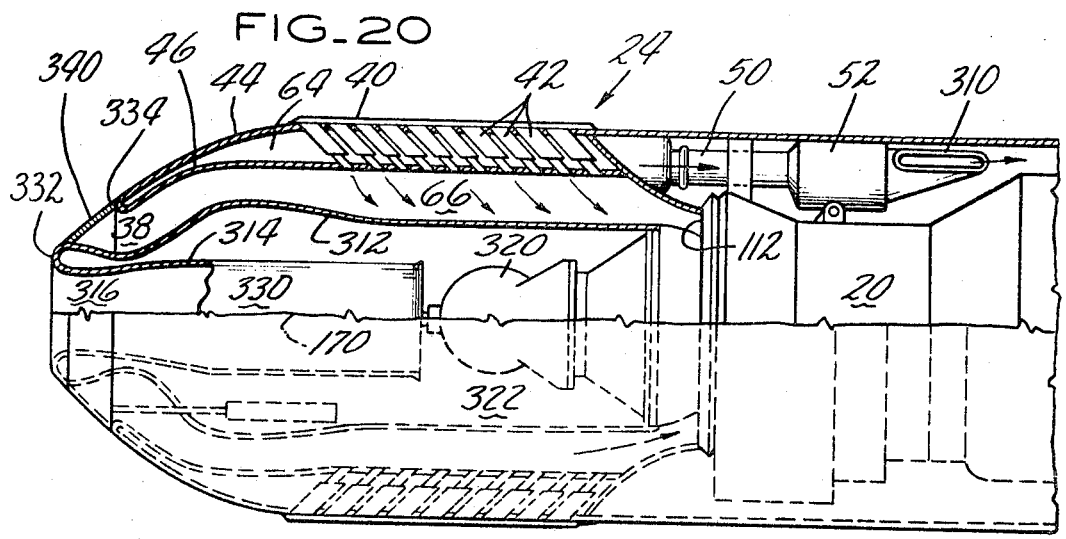
FIG. 20 is a closs-sectional side view of a modification of the separator adapted for use with an air-breathing engine having an annular inlet.
Figure 21:
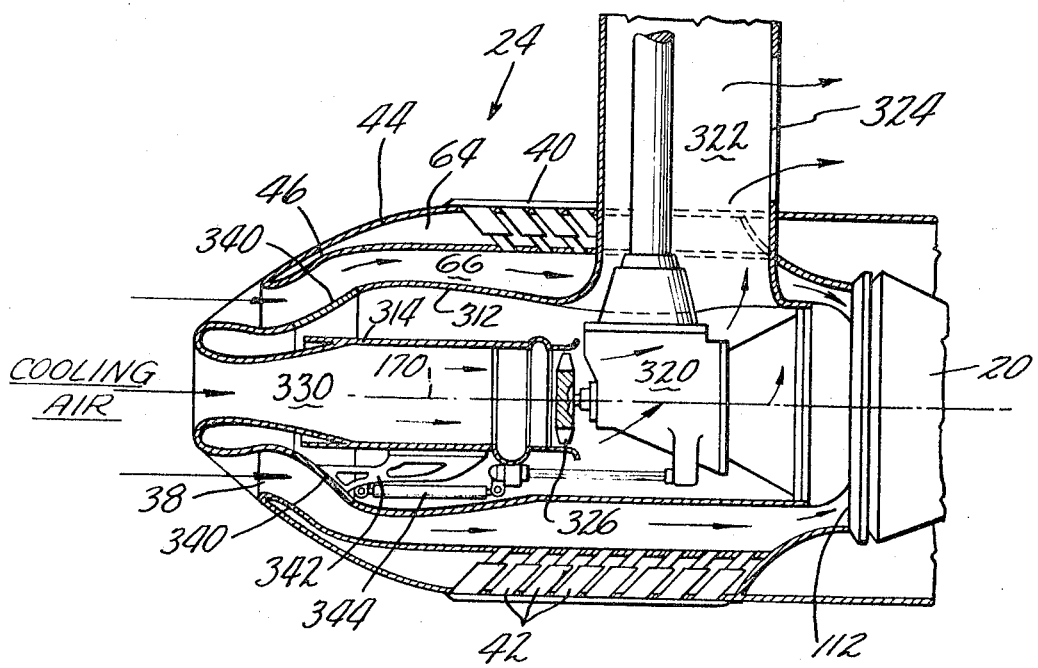
FIG. 21 is a cross-sectional top view of the modification of the separator shown in FIG. 20.

Another embodiment of the engine air inlet particle separator is shown in FIGS. 20 and 21. This construction is particularly adapted for use with an air-breathing engine 20 having an annular inlet 112. Separator assembly 24 is positioned forward of engine inlet 112 and includes outer wall 44 and inner wall 46 spaced to define scavenge chamber 64 therebetween and having a plurality of centrifugal separator tube members 42 extending therethrough so that, as previously described in connection with FIG. 6, atmospheric air may have foreign particles separated therefrom bypassing through coarse screen separator 40 and then through separator tubes 42 to deposit the separated foreign material into chamber 64 before passing into annular inlet compartment 66. As in the other embodiment of the separator, the separated material is removed from scavenge chamber 64 through scavenge duct system 50 by the action of suction unit 52, and exhaust at exhaust outlet 310. A third wall member 312 is positioned in spaced relation inward of wall member 46 and cooperates therewith to define annular inlet compartment 66 therebetween. A fourth wall member 314 is positioned inward of wall member 312 and has an inlet opening 316 at the forward end thereof which is open to atmosphere to receive ram air during aircraft forward motion, which ram air passes over engine or aircraft accessories 320 in cooling chamber 322 and is then released to atmosphere through cooling air outlet 324. Blower member 326 is positioned in cooling air passageway 330 defined within wall member 314 and may be driven by the accessory drive unit 320 to draw cooling air into the accessory chamber 322 when the aircraft is not in motion. Wall members 44, 46, 312 and 314 are preferably of circular cross section and concentric about axis 170 so that chamber 64 and compartment 66 are annular in cross section. It will be noted that the forward end 332 of wall member 312 is positioned substantially forward of the forward end 334 of wall member 46 so that the annular inlet aperture 38 to inlet compartment 66 is canted with respect to axis 170. Tapered annular bypass door or ring 340 is mounted on bracket members 342 to be caused, by the action of fluid power cylinders 344, to reciprocate between its FIG. 20 closed position wherein it blocks airflow into inlet compartment 66 through inlet aperture 38 and its open FIG. 21 position wherein air may enter into compartment 66 and hence engine 20 through inlet aperture 38. Accordingly, when bypass door 340 is closed as in FIG. 20, separator assembly 24 is operating in its complete filtration mode wherein all air which enters engine 20 must pass through the centrifugal separator tubes 42. When bypass door 340 is in its FIG. 21 open position, ram air may enter inlet aperture 38 to pass through inlet compartment 66 into engine 20 in a bypass mode of operation.

FIGS. 22, 23 and 24 show another modification of the engine inlet air particle separator in which the separator is formed to be generally dome-shaped and to be axially movable forward of the engine to generate a bypass space therebetween for bypass mode of operation or to sealably engage the engine inlet during the filtration mode of operation.

FIG. 22 shows separator assembly 24 supportably positioned from fuselage 12 by pivot linkage 400, 402 and 404 (FIG. 24) each of which is pivotally connected to the fuselage and to the separator assembly. Any convenient mechanism such as pilot operated motor 406 can be used to coact with pivot links 400, 402 and 404 to move the separator assembly 24 to a bypass position as shown in FIG. 22 wherein atmospheric air can pass around the separator assembly and into the engine inlet 112. The air bypassing the separator 24 and entering the engine 20 directly must follow a circuitous route and hence the larger particles, such as ice will be separated therefrom before the air enters the engine inlet 112. The same mechanism can cause separator assembly 24 to move to the FIG. 23 position where it sealably engages engine inlet 112 by the action of circumferential seal ring 408. With separator assembly 24 in the FIG. 23 filtration position, all air entering engine inlet 112 must pass through the separator tubes 42. The FIGS. 22-24 separator assembly is made of a plurality of sealably joined, pie-shaped segments such as 410 and 412, each of which is arcuate in form and the plurality of segments are circumferentially positioned and joined so as to form the dome-shape. Each segment, such as 412 (FIG. 23) includes an outer wall 44 and an inner wall 46 spaced therefrom to form scavenge chamber 64 therebetween. Each pie-shaped segment such as 412 includes a plurality of centrifugal separator tubes 42 arranged in banks as illustrated in FIG. 23 and with a coarse filtration medium, such as wire mesh 40, covering the tubes. The particles which are separated from the engine inlet air and deposited in chamber 64 are removed therefrom in scavenge fashion by suction blower 52. The outer and inner walls of adjacent pie-shaped segments such as 410 and 412 may be joined in any convenient fashion such as the overlapping, bolted or riveted construction shown in FIG. 25.

Another modification of the engine inlet air particle separator is shown in FIG. 26. This modification is of rectangular cross section including a top panel member 420, a bottom panel member (not shown) and two side panel members 422 and 424. Each of these panels is fabricated in the fashion described in connection with FIGS. 6 and 7 so that the particles which are separated from the engine air passing through filter tubes 42 may be scavenged from the chamber 64 between the outer and inner walls 44 and 46 through scavenge duct system 50, due to the action of scavenge pump 52. The panels are joined and cooperate to define inlet compartment 66 therewithin having an inlet opening 38 and an outlet opening 110 at the opposite sides thereof. Outlet opening 110 sealably engages the inlet of engine 20.

The FIG. 26 modification is unique in that includes two additional filter panels 430 and 432 which function as bypass doors, each of which is pivotally mounted in inlet compartment 66 at pivot points 434 and 436 so as to be movable between a first position wherein panels 430 and 432 are juxtapositioned and extend along the axis 170 of the separator assembly 24 and a second position wherein the panels 430 and 432 form a V-shaped dam across inlet compartment 66. Filter panels 430 and 432 are fabricated as described in connection with FIG. 6. The separator assembly 24 shown in FIG. 26 can be operated in a bypass mode of operation when the separator panels 430 and 432 are in their juxtapositioned, non-blocking position.

This separator assembly modification can be operated in a filtration mode of operation when the filter panels 430 and 432 are in their V-shaped blocking positions.

Ice deflector 37 is positioned in front of separator assembly 24 and is mounted on actuating rods such as 426 and 428, which are caused to actuate by any convenient means such as an electric motor so as to cause deflector 37 to move from a raised position requiring inlet air and ice particles to pass therearound in a circuitous path to a lowered position where it will not obstruct the passage of air.

The separator assembly 24 can therefore be operated in a bypass mode with deicing since the aforementioned circuitous path is followed by the air passing around deflector 37 and entering inlet compartment 66.

Another modification of the engine inlet air particle separator is shown in FIGS. 27–29. In this modification, the separator is generally of the construction described in connection with the separators illustrated in substantial particularity in FIGS. 2, 3, 4, 6 and 7 and the unique feature thereof is the bypass door arrangement. In the modification shown in FIG. 27, an aperture 440 is fabricased into side panel 82 and axially translatable door 442 is received in runners 444 and 446 in side panel 82. When door 442 is in the position shown in FIG. 27, aperture 440 is open and bypass flow from atmosphere may enter inlet compartment 66 through aperture 440, without passing through any of the centrifugal separator tubes 42 in the various panels. When complete filtration of air entering inlet compartment 66 is desired, bypass door 442 is translated so as to close aperture 440, thereby causing all air which enters inlet compartment 66 to pass through one of the centrifugal air separator tubes 42 in one of the filter panels. An advantage of this construction is that a filter panel 450, of the construction described in connection with FIG. 6 may be placed at the forward end of the filter assembly 24, to receive ram air during aircraft flight operation.

The construction shown in FIG. 28 is generally similar to the construction shown in FIG. 27 except that the bypass doors are of a different variety. In this construction an aperture 452 is fabricated in one of the side panels such as 82 and one or more sets of bypass doors 454 may be mounted therein. Each of the bypass doors 454 includes a top portion 456 and a bottom portion 458, which are pivotally connected to side members 82 by any convenient means such as hinge members 460 and 462 and are of selected size and shape so as to fill aperture 452 when in their closed position. In the FIG. 28 construction, all air entering inlet compartment 66 must pass through a centrifugal separator tube 42 when the bypass doors are closed and may enter inlet compartment 66 through inlet aperture 452 when the bypass doors are open, thereby eliminating filtration.

The engine inlet air particle separator shown in FIG. 29 is similar to the separator assemblies shown in FIGS. 27 and 28 but differs therefrom in the bypass door construction. Again, a side panel 82 is fabricated to have an inlet aperture 466 therein. Bypass door 468 is pivotally mounted on side panel 82 by any convenient fashion, such as hinge joints (not shown) to be pivotable between a first position wherein bypass door 468, due to its shape and size, fully closes inlet aperture 466, thereby causing all air which enters inlet compartment 66 to pass through centrifugal separator tubes 42. When bypass door 468 is actuated to its open position, the air may enter inlet compartment 66 through inlet opening 466 without passing through the centrifugal separators 42. The bypass doors of the FIGS. 27–29 constructions may be operated in any convenient fashion, such as pilot operated electric or hydraulic motors.

Other modifications of the engine inlet air particle separator are shown in FIGS. 30–32. These separators are generally of the type described in connection with FIGS. 2, 3, 4, 6 and 7, except that the filter panels are mounted so as to be movable. As best shown in FIG. 30, this modification of separator assembly 24 includes a top filter panel 470 and two-side filter panels 472 and 474, each of which are pivotally mounted by any convenient method, such as hinge joints 476 and 478 in support frame and scavenge duct system 450, to be movable between a first position shown in FIG. 30 wherein the filter panels 472, 470 and 474 completely fill the apertures 480, 482 and 484 in frame 450 when separator assembly 24 is in the filtration mode of operation so that all air entering inlet compartment 66 must pass through the centrifugal separator tubes 42. The filter panels 470, 472 and 474 may be pivoted to their FIG. 31 open positions for bypass operation during which air may enter inlet compartment 66 through any of the apertures 480, 482 or 484.

The FIG. 32 construction differs from the FIGS. 30–31 constructions in that the filter panels 470, 472 and 474 are pivotally attached to the after or downstream end of frame 450, whereas the filter panels are attached to the forward or upstream end of frame 450 in the FIGS. 30–31 constructions.

If sealing is required between the movable filter panels and frame member 450 in the FIGS. 30–32 constructions, it will be evident that such sealing may be of the peripheral seal design illustrated in FIG. 33, wherein peripheral seals 500 and 502 of the outer wall 504 of frame 450 coact with peripheral seals 506 and 508 of the outer walls 44 of movable filter panels 470 and 474. In similar fashion, peripheral seals 510 and 512 of the inner wall 514 of frame 450 coact with peripheral seals 516 and 518 of the inner walls 46 of movable panel members 470 and 474. The peripheral seals are preferably made of rubber, Teflon, nylon or the like.

The construction shown in FIGS. 34–36 is another modification of the engine inlet air particle separator. This construction is generally similar to the constructions previously described in connection with FIGS. 2, 3, 4, 6 and 7 as well as 30–32, except that while top filter panel 520 is fixed, side panels 522 and 524, which may or may not be filter panels, are pivotally mounted to frame and scavenge duct system 450. Another difference in this construction from the previously described constructions is that the back wall member 530 is made of top portion 532 and bottom portion 534, each of which is pivotally attached by any convenient method such as hinge joints 536 and 538 to frame 450. It will be noted by observing FIGS. 34–36 that side panels 522 and 524 may be pivoted between their FIGS. 34–35 closed positions wherein they form part of the filtration system to their FIG. 36 open position, wherein they provide openings into inlet compartment 66 through apertures 540 and 542 in frame 450. This modification of the engine inlet air particle separator is shown in its complete filtration mode of operation in FIG. 34, wherein all air entering engine inlet compartment 66 must pass through the centrifugal separator tubes 42 in the filter panels 520, 522 and 524. If bypass operation is desired, either side panels 522 and 524 may be pivoted to their FIG. 36 positions and back wall members 532 and 534 may be left in their FIG. 34 position or back wall members 532 and 534 may also be pivoted to their FIGS. 35–36 position, thereby permitting bypass airflow into engine inlet compartment 66 without passing through the tubes 42.

With filter assembly 24 in the bypass mode of operation illustrated in either FIG. 35 or 36, it will be noted that atmospheric air must flow through a circuitous route around portions of filter assembly 24 to enter the engine inlet and therefore large particles, such as ice, will be separated from the atmospheric air and will not enter the engine inlet. It is considered particularly desirable to place back wall members 532 and 534 into their FIG. 35 or FIG. 36 positions during bypass operation because ice would build up thereon, if they remained in their FIG. 34 position, and would seen cause ice flow into the engine inlet due to the proximity between the engine inlet and wall members 532 and 534.

We claim:
1. An engine inlet air particle separator including a plurality of selectively shaped filter panels each having spaced inner and outer walls defining a chamber therebetween, means directly joining said filter panels so that said panels form a passageway therewithin adapted to be joined to an engine inlet and so that said chambers are airtight, a plurality of centrifugal separator tube members each extending between and through said walls and having an inlet connected to said outer wall to communicate with atmosphere external of said outer wall and also having a clean air outlet connected to said inner wall and communicating with said passageway within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, and a scavenge duct system having a hollow interior communicating with said chambers so that the particles separated from the air passing through said separator tube members and entering said chamber may pass into said scavenge duct system.

2. In an aircraft having a forward end and an after end, and further having a fuselage and an engine with an engine air inlet, an engine inlet air particle separator including a plurality of filter panels each having spaced inner and outer walls defining a chamber therebetween, means joining said filter panels so that said panels form a passageway therewithin adapted to be joined to said engine inlet, a plurality of centrifugal separator tube members each extending between and through said inner and outer walls and having an inlet connected to said outer wall to communicate with atmosphere external of said outer wall and also having a clean air outlet connected to said innerwall and communicating with said passageway within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, and a scavenge duct system having a hollow interior communicating with said chambers so that the particles separated from the air passing through said centrifugal separator tube members and entering said chambers may pass into said scavenge duct system, and means supporting said engine air inlet particle separator from said fuselage so that said engine air inlet particle separator may be moved away from said engine inlet to form a separation therebetween through which air may flow to enter said engine inlet.

3. An aircraft having:
(a) a fuselage,
(b) an engine having an air inlet with an axis,
(c) a dome-shaped engine inlet air particle separator concentric about said axis and having a closed forward end and an open after end of circular cross section and comprising:
  (1) a series of circumferentially positioned and pie-shaped sections joined to form a dome-shaped passageway therewithin and each comprising an outer wall communicating with atmosphere and an inner wall spaced therefrom so that said joined outer and inner walls of said pie-shaped segments cooperate to define an airtight chamber therebetween,
  (2) a plurality of centrifugal separator tube members each extending between and through said inner and outer walls and having an inlet connected to said outer wall to communicate with atmosphere external of said outer wall and also having a clean air outlet connected to said inner wall and communicating with said passageway within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
  (3) means connected to said chamber to apply a scavenging suction force thereto,
(d) and means supported from said fuselage to cause said engine inlet air particle separator to reciprocate substantially axially between a first position wherein said circular after end is in alignment with and juxtapositioned to said engine air inlet and a second position wherein said circular outlet is separated axially forward of said engine air inlet to define an annular air inlet space between said engine and said separator.

4. A filter cage adapted to be connected to the inlet of an engine and including:
(a) a top wall having an aperture therein,
(b) a bottom wall,
(c) two side walls each having an aperture therein,
(d) a front wall and a back wall joined to said top, bottom, and side walls to define a compartment therewithin,
(e) said back wall being fabricated of two parts including:
  (1) a top portion pivotally attached to said top wall,
  (2) a bottom portion pivotally attached to said bottom wall and both portions being movable between a first position wherein said bottom portion lies flat against said bottom wall and said top portion lies flat against said top wall and a second position wherein said top and bottom portions align and abut to form said back wall, and said top and bottom portions being shaped so as to coact when in said second position to define an outlet for said compartment adapted to be connected to an engine inlet,
(f) a filter panel located in and filling said apertures in each of said top and said side walls and each including:
  (1) an outer wall member communicating with atmosphere,
  (2) an inner wall member spaced therefrom and sealably conected thereto to define a chamber therebetween and communicating with said compartment,
(g) said filter panels in said side walls each being pivotably attached to said side walls and pivotably between a first position wherein said filter panels fill said side wall apertures to form a part of said side walls and a second position wherein said filter panels rest against said bottom wall to place said compartment into communication with atmosphere through said side wall apertures,
(h) a plurality of centrifugal separator tube members each extending between and through said inner and outer wall members and having an inlet connected to said outer wall member to communicate with atmosphere external of said outer wall member and also having a clean air outlet connected to said inner wall member and communicating with said compartment within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said compartment,
(i) and suction means joined to said chambers to scavenge separated particles therefrom.

5. A filter cage adapted to be connected to the inlet of an engine and including:
(a) a top wall having an aperture therein,
(b) a bottom wall,
(c) two side walls each having an aperture therein,
(d) means joining said walls to form a compartment therewithin,
(e) a filter panel pivotally connected to each of said top wall and said side walls and shaped to fill said aperture therein and being adapted to be moved between a first position wherein said filter panels fill said apertures so that air may enter said compartment through said filter panels only and a second position wherein said filter panels are spaced from said apertures to permit airflow into said compartments through said apertures, each of said filter panels including:
  (1) an outer wall communicating with atmosphere,
  (2) an inner wall spaced therefrom and sealably connected thereto to define a chamber therebetween, and
  (3) a plurality of centrifugal separator tube members each extending between and through said inner ad outer walls and having an inlet connected to said outer wall to communicate with atmosphere external of said outer wall and also having a clean air outlet connected to said inner wall and communicating with said compartment within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said compartment, (f) and a suction system connected to said chambers to scavenge filtered particles therefrom.

6. A filter cage adapted to be connected to the inlet of an engine and including:
(a) a top wall having an aperture therein,
(b) a bottom wall,
(c) two side walls each having an aperture therein,
(d) a front wall and a back wall joined to said top, bottom, and side walls to define a compartment therewithin,
(e) said back wall being fabricated of two parts including:
  (1) a top portion pivotally attached to said top wall,
  (2) a bottom portion pivotally attached to said bottom wall and both portions being movable between a first position wherein said bottom portion lies flat against said bottom wall and said top portion lies flat against said top wall and a second position wherein said top and bottom portions align and abut to form said back wall, and said top and bottom portions being shaped so as to coact when in said second position to define an outlet for said compartment adapted to be connected to an engine inlet,
(f) a panel located in and filling said apertures in each of said top and said side walls,
(g) at least one of said panels being a filter panel and including:
  (1) an outer wall member communicating with atmosphere,
  (2) an inner wall member spaced therefrom and sealably connected thereto to define a chamber therebetween and communicating with said compartment,
  (3) a plurality of centrifugal separator tube members each extending between and through said inner and outer wall members and having an inlet connected to said outer wall member to communicate with atmosphere external of said outer wall member and also having a clean air outlet connected to said inner wall member and communicating with said compartment within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said chamber and clean air will enter said compartment,
(h) said panels in said side walls each being pivotably attached to said side walls and pivotably between a first position wherein said fiter panels fill said side wall apertures to form a part of said side walls and a second position wherein said filter panels rest against said bottom wall to place said compartment into communication with atmosphere through said side wall apertures,
(i) and suction means joined to said chamber to scavenge separated particles therefrom.

7. In an aircraft having a forward end and an after end and also having a fuselage and an engine with an air inlet, an engine inlet air particle separator to separate foreign particles from the air entering the inlet of said engine including two substantially vertically extending and laterally separated side members and a top member and a bottom member, means joining said side members to said top and bottom members so as to define a passageway therewithin and which passageway has a forward opening and rearward opening and with said rearward opening communicating with said engine inlet, said side members and said top and bottom members having spaced inner and outer walls which are joined to define a chamber therebeteween, a plurality of centrifugal separator tube members extending between and connected to said walls of said side members and constituting the sole gas flow paths therebetween a plurality of centrifugal separator tube members extending between and connected to said walls of said top member and constituting the sole gas flow path therebetween, each of said tube members having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, a scavenge duct system having a hollow interior communicating with each of said chambers so that the particles separated from the air passing through said centrifugal separator tube members and entering said chambers may pass into said scavenge duct system, and valve means located in said forward opening and having a closed position to cause the particle-ladened ambient air to enter the duct passageway through the separator tube members only and an open position to permit the particle-ladened ambient air to enter said passageway directly through said forward opening and including bypass doors mounted in said forward opening and actuatable between a closed position wherein airflow into said passageway through said forward opening is blocked and an opened position wherein airflow through said forward opening into said passageway is substantially unrestricted, wherein said bypass doors include a swivelling panel member positioned for swivelling motion at substantially the center of said forward opening and selectively guided plate members pivotally connected to opposite sides of said panel member, said panel member and said plate members being of selected size so that when said panel member is positioned in the plane of said forward opening, said plate members cooperate therewith to block off said forward opening and so that when said panel member is positioned to be askew with respect to the plane of said forward opening, said plane members are selectively positioned to partially open said forward opening.

8. An engine inlet air particle separator including:
(a) a plurality of filter panels each having spaced inner and outer walls defining a chamber therebetween and including selectively shaped peripheral extensions projecting from said outer walls and said inner walls,
(b) means joining peripheral extensions of said filter panels so that said panels so joined form a compartment therewithin adapted to be joined to an engine inlet,
(c) a plurality of centrifugal separator tube members each extending between and through said walls and having an inlet connected to said outer wall to communicate with atmosphere external of said outer wall and also having a clean air outlet connected to said inner wall and communicating with said compartment within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said compartment,
(d) and a scavenge duct system having a hollow interior communicating with said chambers so that the particles separated from the air passing through said centrifugal separator tube members and entering said chamber may pass into said scavenge duct system,
(e) and bypass means to permit atmospheric air into said compartment without passing through said tube members.

9. Apparatus according to claim 8 wherein said coarse filter mechanism comprises individual screen mesh members covering the air entrance to said separator tube members.

10. Apparatus according to claim 8 and including pressure indicating means located in said scavenge duct system.

11. In an aircraft having a fuselage and also having an engine with an engine air inlet, an engine inlet air particle separator including a plurality of selectively shaped filter panels each having spaced inner and outer walls with selectively shaped peripheral extensions projecting therefrom, means joining said peripheral extensions of said inner walls of said filter panels so that said inner walls form a passageway therewithin joined to said engine inlet, means joining said peripheral extensions of said outer walls of said filter panels so that said outer walls so joined cooperate with said inner walls so joined to form a chamber therebetween, a plurality of centrifugal separator tube members each extending between and through said inner and outer walls and forming the sole gas flow passages therebetween and having an inlet connected to said outer wall to communicate with atmosphere external of said outer wall and also having a clean air outlet connected to said inner wall and communicating with said passageway within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, and a scavenge duct system having a hollow interior communicating with said chambers so that the particles separated from the air passing through said centrifugal separator tube members and entering said chamber may pass into said scavenge duct system.

12. Apparatus according to claim 11 and including means to support said particle separator in spaced relation from said fuselage.

13. Apparatus according to claim 11 including a suction creating device attached to said scavange duct system, and wherein said engine is a turbojet engine including a compressor section, and further including means connecting said engine compressor section to said scavenge duct system to power said suction creating device.

14. An engine air inlet particle separator comprising:
(a) a plurality of filter panels each including an outer wall adapted to communicate with atmosphere and having peripheral extensions projecting therefrom and an inner wall spaced inwardly thereof and having peripheral extensions projecting therefrom,
(b) means sealably connecting said projections of said inner walls so that said inner walls so joined define a passageway therewithin, means sealably connecting said peripheral extensions of said outer walls of said filter panels so that said outer walls so joined and said inner walls so joined define a chamber therebetween, said filter panels being shaped so as to cooperate to define an engine air inlet particle separator of D-shaped cross section having both an inlet and an outlet of D-shaped cross section, so that said passageway is of D-shaped cross section and so that said chamber is of D-shaped cross section,
(c) a plurality of centrifugal separator tube members each extending between and through said inner and outer walls of at least one of said filter panels and having an inlet connected to said outer wall to communicate with atmosphere external of said outer wall and also having a clean air outlet connected to said inner wall and communicating with said passageway within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clear air will enter said passageway, (d) suction creating means connected to said D-shaped chamber to scavenge separated particles therefrom, (e) and bypass doors positioned in said inlet and mounted to be movable between a first position wherein said doors block airflow through said inlet and a second position wherein airflow is permitted past said doors into said passageway.

15. In an engine inlet air particle separator for the inlet of an air-breathing engine comprising:

(a) a filter cage adapted to be connected to the engine inlet and including:

(1) a plurality of filter panels joined directly to form an airtight compartment connected to the engine inlet and each including:

(A) an outer wall adapted to communicate with atmosphere, (B) an inner wall communicating with said compartment and spaced from and sealably connected to said outer wall to define a chamber therebetween, (C) a plurality of centrifugal separator tube members each extending between and through said inner and outer walls and having an inlet connected to said outer wall to communicate with atmosphere external of said outer wall and also having a clean air outlet connected to said inner wall and communicating with said compartment within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clear air will enter said compartment, (2) means connecting to said chamber to apply a suction load thereto to remove foreign material therefrom, (3) an aperture in said filter cage, (4) door means connected to said filter cage and actuatable between a first position wherein said door means plugs said aperture to block airflow therethrough and a second position wherein said door means is open to permit airflow through said aperture into said compartment, (5) wherein said door means include a swivelling panel member positioned for swivelling motion at substantially the center of said forward opening and selectively guided plate members pivotally connected to opposite sides of said panel member, said panel member and said plate members being of selected size so that when said panel members is positioned in the plane of said forward opening, said plate members cooperate therewith to block off said forward opening and so that when said panel member is positioned to be askew with respect to the plane of said forward opening, said plate members are selectively positioned to partially open said forward opening.

16. In an engine inlet air particle separator for the inlet of an air-breathing engine comprising:

(a) a filter cage adapted to be connected to the engine inlet and including:

(1) a plurality of filter panels joined to form an airtight compartment connected to the engine inlet and each including:

(A) an outer wall adapted to communicate with atmosphere, (B) an inner wall communicating with said compartment and spaced from and sealably connected to said outer wall to define chamber therebetween, (C) a plurality of centrifugal separator tube members each extending between and through said inner and outer walls and having an inlet connected to said outer wall to communicate with atmosphere external of said outer wall and also having a clean air outlet connected to said inner wall and communicating with said compartment within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clear air will enter said compartment, (2) means connecting to said chamber to apply a suction load thereto to remove foreign material therefrom, (3) an aperture in said filter cage, (4) door means connected to said filter cage and actuable between a first position wherein said door means plugs said aperture to block airflow therethrough and a second position wherein said door means is open to permit airflow through said aperture into said compartment, (5) wherein said filter cage includes at least one aperture placing said compartment into communication with atmosphere, and further wherein at least one of said filter panels is pivotably connected to said filter cage and is shaped so as to be pivotable between a first position wherein said filter panels fill said aperture and forms a part of said filter cage so that the only communication between said compartment and atmosphere is through said centrifugal separator tubes and a second position wherein said filter panel pivots away from said filter cage to open said aperture to thereby permit the entry of atmospheric air into said compartment through said aperture.

17. An engine inlet air particle separator comprising:

(a) an outer wall member of D-shaped cross section, (b) an inner wall member of D-shaped cross section enveloped within said outer wall member and defining a passageway of D-shaped cross section therewithin having a D-shaped inlet and a D-shaped outlet, (c) means supporting said wall members in spaced relation to define a chamber of D-shaped cross section therebetween and so that said D-shaped chamber is airtight, (d) a plurality of centrifugal separator tube members each extending between and through said inner and outer wall members and having an inlet connected to said outer wall member to communicate with atmosphere external of said outer wall member and also having a clean air outlet conected to said inner wall member and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, (e) suction creating means connected to said chamber to scavenge foreign particles therefrom, (f) and valve means located in said D-shaped inlet and actuatable between a first position wherein airflow through said D-shaped inlet is blocked and a second position wherein airflow through said D-shaped inlet is permitted, (g) and including an aircraft having a fuselage and an air-breathing engine with a D-shaped inlet to said engine, means supporting said engine inlet air particle separator in spaced relationship to said fuselage and so that said separator is positioned forward of said engine and, further so that said filter D-shaped outlet and said engine inlet are in alignment, and means sealably connecting said separator D-shaped outlet and said engine D-shaped inlet.

18. In an aircraft having a forward end and an after end and also having a fuselage and en engine with an air inlet, an engine inlet air particle separator to separate foreign particles from the air entering the inlet of said engine including two substantially vertically extending and laterally separated side members and a top member and a bottom member, means joining said side members to said top and bottom members so as to define a passageway therewithin and which passageway has a forward opening and rearward opening and with said rearward opening comunicating with said engine inlet, said side members said top and bottom members having spaced inner and outer walls which are joined to define a chamber therebtween, a plurality of centrifugal separator tube members extending between and connected to said walls of said side members and constituting the sole gas flow paths therebtween, a plurality of centrifugal separator tube members extending between and connected to said walls of said top member and constituting the sole gas flow path therebetween, each of said tube members having an inlet connected to said outer wall to communicate with atmosphere external of said outer wall member and also having a clean air outlet connected to said ineer wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, a scavenge duct system having a hollow interior communicating with each of said chambers so that the particles separated from the air passing through said centrifugal separator tube members and entering said chambers may pass into said scavenge duct system, and valve means located in said forward opening and having a closed position to cause the particle-ladened ambient air to enter the duct passageway through the separator tube members only and an open position to permit the particle-ladened ambient air to enter said passageway directly through said forward opening and including engine powered suction pump means operatively associated with said scavenge duct system.

19. In an aircraft having a forward end and an after end and also having a fuselage and an engine with an air inlet, an engine inlet air particle separator to separate foreign particles from the air entering the inlet of said engine including two substantially vertically extending and laterally separated side members and a top member and a bottom member, means joining said side member to said top and bottom members so as to define a passageway therewithin and which passageway has a forward opening and rearward opening and with said rearward opening communicating with said engine inlet, said side members and said top and bottom members having spaced inner and outer walls which are joined to define a chamber therebetween, a plurality of centrifugal separator tube members extending between and connected to said walls of said side members and constituting the sole gas flow paths therebetween, a plurality of centrifugal separator tube members extending between and connected to said walls of said top member and constituting the sole gas flow path therebetween, each of said tube members having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, a scavenge duct system having a hollow interior communicating with each of said chambers so that the particles separated from the air passing through said centrifugal separator tube members and entering said chambers may pass into said scavenge duct system, and valve means located in said forward opening and having a closed position to cause the particle-ladened ambient air to enter the duct passageway through the separator tube members only and an open position to permit the particle-ladened ambient air to enter said passageway directly through said forward opening wherein said passageway rearward opening as spaced from said engine air inlet, and including sealing means connecting said rearward opening to said engine inlet so as to permit relative motion therebetween.

20. In an aircraft having a forward end and an after end and also having a fuselage and an engine with an air inlet, an engine inlet air particle separator to separate foreign particles from the air entering the inlet of said engine including two substantially vertically extending and laterally separated side members and a top member and a bottom member, means joining said side member to said top and bottom members so as to define a passageway therewithin and which passageway has a forward opening and rearward opening and with said rearward opening communicating with said engine inlet, said side members and said top and bottom members having spaced inner and outer walls which are joined to define a chamber therebetween, a plurality of centrifugal separator tube members extending between and connected to said walls of said side members and constituting the sole gas flow paths therebetween, a plurality of centrifugal separator tube members extending between and connected to said walls of said top member and constituting the sole gas flow path therebetween, each of said tube members having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, a scavenge duct system having a hollow interior communicating with each of said chambers so that the particles separated from the air passing through said centrifugal separator tube members and entering said chambers may pass into said scavenge duct system, and valve means located in said forward opening and having a closed position to cause the particle-ladened ambient air to enter the duct passageway through the separator tube members only and an open position to permit the particle-ladened ambient air to enter said passageway directly through said forward opening wherein said particle separator is spaced from said engine inlet to define an aperture therebetween, and including an inflatable seal positioned and shaped to fill said aperture when inflated and to permit airflow through said aperture to said engine when deflated.

21. An engine inlet air particle separator comprising:
   (a) an outer wall member of D-shaped cross section,
   (b) an inner wall member of D-shaped cross section enveloped within said outer wall member and defining a passageway of D-shaped cross section therewithin having a D-shaped inlet and a D-shaped outlet,
   (c) means supporting said wall members in spaced relation to define a chamber of D-shaped cross section therebetween and so that said D-shaped chamber is airtight,
   (d) a plurality of centrifugal separator tube members each extending between and through said inner and outer wall members and having an inlet connected to said outer wall member to communicate with atmosphere external of said outer wall member and also having a clean air outlet connected to said inner wall member and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
   (e) suction creating means connected to said chamber to scavenge foreign particles therefrom,
   (f) and valve means located in said D-shaped inlet and actuatable between a first position wherein airflow through said D-shaped inlet is blocked and a second position wherein airflow through said D-shaped inlet is permitted, and wherein said outer and inner wall members gradually increase in cross-sectional area between said D-shaped inlet and a point forward of said D-shaped outlet and gradual decrease in a cross-sectional area from the aforementioned point to said D-shaped outlet.

22. In an engine inlet air particle separator for the inlet of an air-breathing engine comprising:
   (a) a filter cage adapted to be connected to the engine inlet and including:
      (1) a plurality of filter panels joined to form an airtight compartment connected to the engine inlet and each including:
         (A) an outer wall adapted to communicate with atmosphere,
         (B) an inner wall communicating with said compartment and spaced from and sealably connected to said outer wall to define a chamber therebetween,
         (C) a plurality of centrifugal separator tube members each extending between and through said inner and outer walls and having an inlet connected to said outer wall to communicate with atmosphere external of said outer wall and also having a clean air outlet connected to said inner wall and communicating with said compartment within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said compartment,
      (2) means connecting to said chamber to apply a suction load thereto to remove foreign material therefrom,
      (3) an aperture in said filter cage,
      (4) door means connected to said filter cage and actuatable between a first position wherein said door means plugs said aperture to block airflow therethrough and a second position wherein said door means is open to permit airflow through said aperture into said compartment wherein said door is pivotably attached to said filter cage and pivots between said first and second positions.

23. In an engine inlet air particle separator for the inlet of an air-breathing engine comprising:
   (a) a filter cage adapted to be connected to the engine inlet and including:
      (1) a plurality of filter panels joined to form an airtight compartment connected to the engine inlet and each including:
         (A) an outer wall adapted to communicate with atmosphere,
         (B) an inner wall communicating with said compartment and spaced from and sealably connected to said outer wall to define a chamber therebetween,
         (C) a plurality of centrifugal separator tube members each extending between and through said inner and outer walls and having an inlet connected to said outer wall to communicate with atmosphere external of said outer wall and also having a clean air outlet connected to said inner wall and communicating with said compartment within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said compartment,
      (2) means connecting to said chamber to apply a suction load thereto to remove foreign material therefrom,
      (3) an aperture in said filter cage,
      (4) door means connected to said filter cage and actuatable between a first position wherein said door means plugs said aperture to block airflow therethrough and a second position wherein said door means is open to permit airflow through said aperture into said compartment wherein said door means slidably engages said filter cage and is slidable between said first and second positions.

References Cited

UNITED STATES PATENTS

| | | | |
|---|---|---|---|
| 821,201 | 5/1906 | Taylor | 160—40 |
| 1,333,325 | 3/1920 | McGee | 55—348 |
| 1,467,826 | 9/1923 | Bumbarger. | |
| 1,659,880 | 2/1928 | Kauffman. | |
| 1,989,010 | 1/1935 | Howard | 55—306 |
| 2,135,750 | 11/1938 | Harding | 55—493 |
| 2,158,273 | 5/1939 | Chilton | 55—306 |
| 2,381,705 | 8/1945 | Vokes | 55—306 |
| 2,552,847 | 5/1951 | Farr et al. | 55—350 |
| 2,583,921 | 1/1952 | Yellott | 55—349 |
| 2,590,952 | 4/1952 | Fukal. | |
| 2,636,666 | 4/1953 | Lombard | 55—306 |
| 2,641,902 | 6/1953 | Kerr | 55—306 |
| 2,711,631 | 6/1955 | Willgoos | 60—39.37 |

(Other references on following page)

UNITED STATES PATENTS

| | | | |
|---|---|---|---|
| 2,747,367 | 5/1956 | Savin | 60—39.16 |
| 2,764,390 | 9/1956 | Harris | 55—306 |
| 2,911,065 | 11/1959 | Yellott et al. | 55—337 |
| 2,928,497 | 3/1960 | Stockdale | 55—306 |
| 2,944,631 | 7/1960 | Kerry et al. | 55—306 |
| 2,960,281 | 11/1960 | Jumelle et al. | 55—306 |
| 3,135,487 | 6/1964 | Kottsieper | 55—306 |
| 3,201,070 | 8/1965 | Chilvers | 244—54 |
| 3,302,396 | 2/1967 | Robbins | 55—306 |
| 3,309,867 | 3/1967 | Ehrich | 55—337 |
| 3,347,496 | 10/1967 | Opfer et al. | 244—53 |
| 3,360,005 | 12/1967 | Sopher et al. | 55—306 |
| 3,362,155 | 1/1968 | Driscoll | 55—306 |
| 3,368,332 | 2/1968 | Hooper et al. | 55—306 |
| 3,383,841 | 5/1968 | Olson et al. | 55—504 |

FOREIGN PATENTS

| | | |
|---|---|---|
| 124,101 | 4/1947 | Australia. |
| 153,184 | 9/1953 | Australia. |
| 251,179 | 4/1964 | Australia. |
| 1,299,917 | 6/1962 | France. |
| 760,513 | 10/1956 | Great Britain. |
| 760,669 | 11/1956 | Great Britain. |
| 926,317 | 5/1963 | Great Britain. |

HARRY B. THORNTON, *Primary Examiner.*

BERNARD NOZICK, *Assistant Examiner.*

U.S. Cl. X.R.

55—337, 347, 348, 456; 60—39.09; 244—53